US009077273B2

(12) United States Patent
Omata et al.

(10) Patent No.: US 9,077,273 B2
(45) Date of Patent: Jul. 7, 2015

(54) CONTROL DEVICE OF AC MOTOR

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 14/174,159

(22) Filed: Feb. 6, 2014

(65) Prior Publication Data

US 2014/0225538 A1 Aug. 14, 2014

(30) Foreign Application Priority Data

Feb. 8, 2013 (JP) ................................. 2013-23274

(51) Int. Cl.
H02P 21/00 (2006.01)
H02P 3/18 (2006.01)
H02P 21/06 (2006.01)
H02P 21/14 (2006.01)

(52) U.S. Cl.
CPC ............ *H02P 21/0035* (2013.01); *H02P 21/06* (2013.01); *H02P 21/146* (2013.01); *H02P 3/18* (2013.01); *H02P 21/0032* (2013.01)

(58) Field of Classification Search
CPC ... H02P 21/0035; H02P 21/06; H02P 21/146; H02P 2207/05; Y02T 10/643
USPC .................................................... 318/400.02
See application file for complete search history.

(56) References Cited

U.S. PATENT DOCUMENTS

| 5,705,909 A * | 1/1998 | Rajashekara ................. 318/801 |
| 2007/0063667 A1 | 3/2007 | Nojima |
| 2008/0079385 A1 | 4/2008 | Hashimoto et al. |
| 2009/0261774 A1 * | 10/2009 | Yuuki et al. .................. 318/720 |
| 2011/0043144 A1 | 2/2011 | Ueda et al. |

(Continued)

FOREIGN PATENT DOCUMENTS

| JP | 2004-159391 | 6/2004 |
| JP | 2005-110343 | 4/2005 |
| JP | 2011-91941 | 5/2011 |

OTHER PUBLICATIONS

Office Action (3 pages) dated Jan. 29, 2015, issued in corresponding Japanese Application No. 2013-023274 and English translation (5 pages).
Omata, et al., U.S. Appl. No. 14/174,102, filed Feb. 6, 2014.
Omata, et al., U.S. Appl. No. 14/174,147, filed Feb. 6, 2014.

(Continued)

*Primary Examiner* — Shawki S Ismail
*Assistant Examiner* — Bradley Brown
(74) *Attorney, Agent, or Firm* — Nixon & Vanderhye PC

(57) ABSTRACT

A control device of a three phase AC motor includes: an inverter for driving the motor; a current sensor for sensing current flowing in a sensor phase of the motor; and a controller for switching multiple switching elements in the inverter to control the current of the motor. An electric angle is defined as θe based on one phase. A phase is defined as φ based on a dq axis. A phase angle of a current command vector is defined as (θe+φ+C). When the motor is stopped, the controller determines whether the current command vector is orthogonal to an axis of the sensor phase. When the current command vector is orthogonal to the axis of the sensor phase, the controller operates the phase or the electric angle to set the current command vector not to be orthogonal to the axis of the sensor phase.

7 Claims, 16 Drawing Sheets

(56) References Cited

U.S. PATENT DOCUMENTS

| | | | |
|---|---|---|---|
| 2011/0050140 A1* | 3/2011 | Sakai et al. | 318/400.36 |
| 2011/0304290 A1* | 12/2011 | Ito et al. | 318/400.32 |
| 2011/0315469 A1* | 12/2011 | Uryu | 180/443 |
| 2012/0068641 A1* | 3/2012 | Imura | 318/400.02 |
| 2012/0256510 A1* | 10/2012 | Yamada et al. | 310/184 |

OTHER PUBLICATIONS

Omata, et al., U.S. Appl. No. 14/174,161, filed Feb. 6, 2014.
Omata, et al., U.S. Appl. No. 14/174,193, filed Feb. 6, 2014.
Omata, et al., U.S. Appl. No. 14/174,200, filed Feb. 6, 2014.
Omata, et al., U.S. Appl. No. 14/174,213, filed Feb. 6, 2014.
Omata, et al., U.S. Appl. No. 14/174,515, filed Feb. 6, 2014.

* cited by examiner

CONTROL DEVICE OF AC MOTOR

CROSS REFERENCE TO RELATED APPLICATION

This application is based on Japanese Patent Application No. 2013-23274 filed on Feb. 8, 2013, the disclosure of which is incorporated herein by reference.

TECHNICAL FIELD

The present disclosure relates to a control device of an AC motor, the control device sensing a phase current of one phase of three phases by a current sensor and controlling current flowing through the AC motor.

BACKGROUND

In recent years, from the social requirement of lower fuel consumption and less exhaust emission, an electric automobile and a hybrid automobile, each of which is mounted with an AC motor as a power source of a vehicle, is drawing attention. For example, in some of the hybrid automobiles, a DC power source made of a secondary battery or the like and an AC motor are connected to each other via an electric power conversion device constructed of an inverter and the like, and a DC voltage of the DC power source is converted into an AC voltage by the inverter to thereby drive the AC motor.

In the control device of the AC motor mounted in this kind of hybrid automobile and electric automobile, there has been known a technique of "one phase control" in which a current sensor for sensing a phase current is provided in one phase and in which current estimated values based on current sensed value of the one phase are fed back, whereby current flowing through the AC motor is controlled (for example, see patent document 1). According to the technique, the current sensor is provided only in the one phase, so that the number of current sensors is reduced and hence a construction near three phase output terminals of an inverter can be reduced in size and the control system of the AC motor can be reduced in cost.

According to a current feedback control based on the technique of the patent document 1, of three phase current command values acquired by inversely dq transforming d axis and q axis (hereinafter referred to as "dq axis") current commands, current command values of two phases other than a sensor phase are treated as current estimated values. Then, a current estimated value of the sensor phase of one phase (for example, a W phase) and dq axis current estimated values acquired by dq transforming the current estimated values of other two phases (for example, a U phase and a V phase) are fed back to dq axis current commands id*, iq*.

In the meantime, a state is assumed in which an AC motor is stopped and in which a current command that is not zero is commanded. Depending on an electric angle and the phase of a current command vector, there can be a case in which the AC motor is stopped at a position in which the phase current of the sensor phase becomes zero. In this case, the current sensed value of the sensor phase is always sensed to be zero.

Here, it is assumed that a term of "stop" includes a low rotation state in which the number of revolutions is not more than a given number of revolutions. Further, at the time of saying that the current is "zero", a term of "zero" includes not only a value of strict 0 [A] but also a value within the substantially same range as 0 [A] in consideration of the sensing error and the resolution of a device. Moreover, at the time of saying that the current is "not zero", the phrase of "not zero" does not mean to exclude only a value of strict 0 [A] but means a value outside the substantially same range as 0 [A].

In this way, when a current sensed value of a sensor phase is always sensed to be zero, in the current feedback control based on the technique of the patent document 1, dq axis current estimated values, which are acquired by dq transforming a value of zero that is a current sensed value of the sensor phase and current estimated values of other two phases, correspond to dq axis current commands id*, iq*. Hence, the dq axis current commands id*, iq* result in being fed back to dq axis current commands id*, iq* as they are, so that dq axis current deviations Δid, Δiq become zero, which hence brings about the same state in which the feedback control is not performed.

For this reason, when the AC motor is stopped at a position in which the current sensed value of the sensor phase is always sensed to be zero according to the electric angle and the phase of the current command vector, in the current feedback control based on the technique of the patent document 1, the drive control of the AC motor is likely to be made unstable.

[Patent Document 1] JP-A No. 2008-86139 (corresponding to US 2008/0079385-A1)

SUMMARY

It is an object of the present disclosure to provide a control device of an AC motor that senses current flowing in a sensor phase as one of three phases and that stably drives the AC motor when the AC motor is stopped and a current sensed value of the sensor phase becomes zero according to an electric angle and a phase of a current command vector.

According to an aspect of the present disclosure, a control device of a three phase alternating current motor includes: an inverter for driving the motor; a current sensor for sensing current flowing in a sensor phase of the motor, which is one of three phases of the motor; and a controller for switching on and off a plurality of switching elements, which provide the inverter, so that the controller controls the current flowing through the motor. An electric angle is defined as θe when one of the three phases is referred as a basis. A phase is defined as φ when a dq axis is referred as a basis. A phase angle of a current command vector is defined as (θe+φ+C). C represents a constant. When the motor is stopped, the controller determines whether the current command vector is orthogonal to an axis of the sensor phase on three phase coordinates. When the controller determines that the current command vector is orthogonal to the axis of the sensor phase, the controller operates the phase or the electric angle so as to perform a non-orthogonalization process for setting the current command vector not to be orthogonal to the axis of the sensor phase.

According to the above control device, when the AC motor is stopped and where the current command vector is orthogonal to the axis of the sensor phase, by making the current command vector non-orthogonal to the axis of the sensor phase by non-orthogonalization processing, a sensor value that is not zero can always be sensed irrespective of a position in which the AC motor is stopped. In this way, in particular, at the time when the AC motor is started and is within a low rotation range, the estimation accuracy of a current value can be improved and hence the AC motor can be stably driven.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, embodiments of a control device of an AC motor according to the present disclosure will be described on the basis of the drawings. First, a construction common to a plurality of embodiments will be described with reference to FIG. 1 and FIG. 2. An electric motor control device 10 as "a control device of an AC motor" according to this embodiment is applied to an electric motor drive system for driving a hybrid automobile.

[Construction of the Control Device of the AC Motor]

Figure 1:
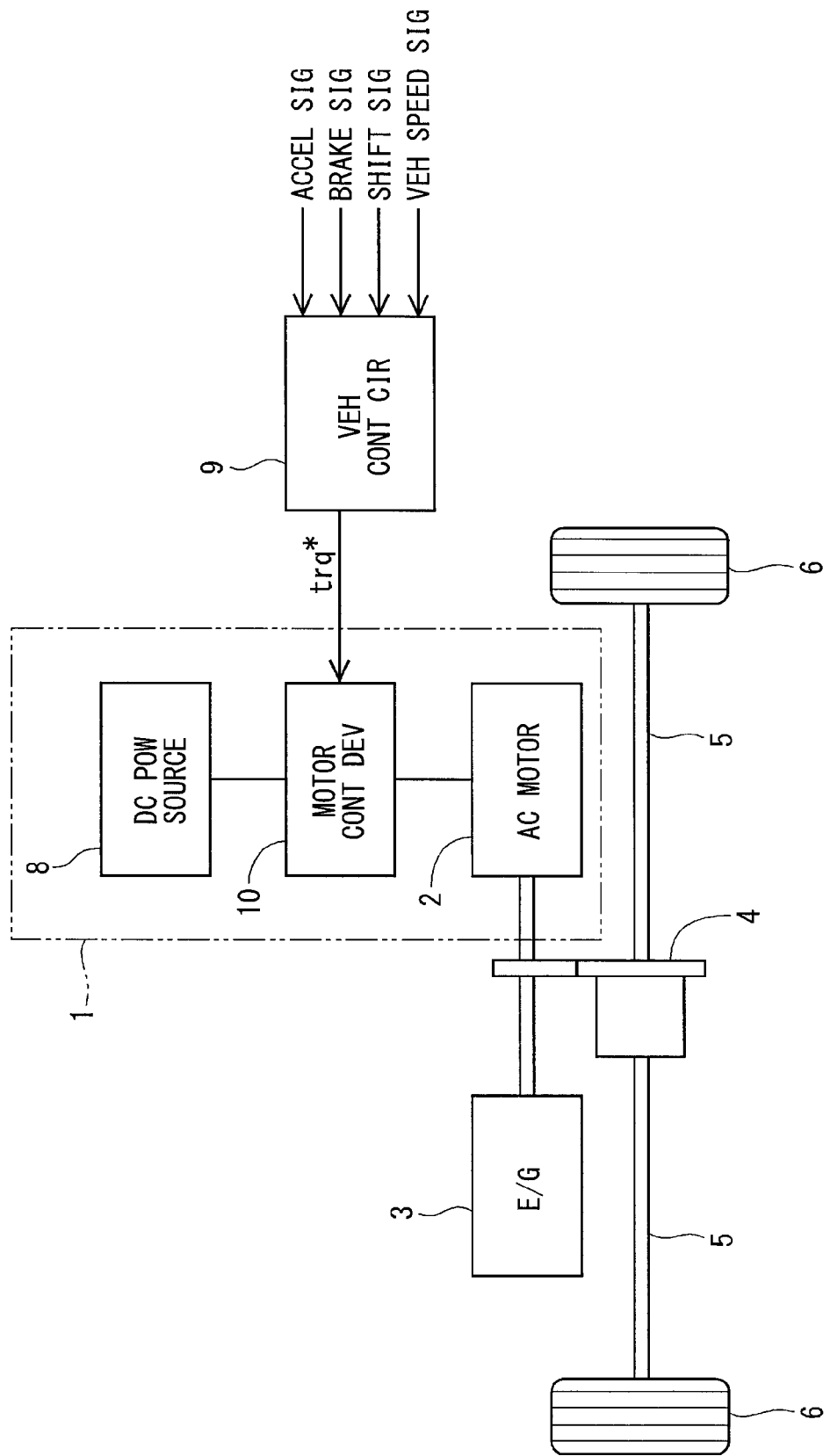
FIG. 1 is a diagram to show a construction of an electric motor drive system to which a control device of an AC motor according to a first embodiment to a third embodiment of the present disclosure is applied.

As shown in FIG. 1, the electric motor drive system 1 includes an AC motor 2, a DC power source 8, the electric motor control device 10, and the like.

The AC motor 2 is, for example, an electric motor for generating torque for driving the driving wheels 6 of the electric vehicle. The AC motor 2 of the present embodiment is a three phase AC motor of a permanent magnet synchronous type.

It is assumed that the electric vehicle includes a vehicle for driving the driving wheels 6 by electric energy such as a hybrid automobile, an electric automobile, and a vehicle powered by a fuel battery. The electric vehicle of the present embodiment is a hybrid vehicle provided with an engine 3, and the AC motor 2 is a so-called motor generator (designated by "MG" in the drawing) having a function as an electric motor that generates torque for driving the driving wheels 6 and a function as a generator that is driven by the kinetic energy of the vehicle, which is transmitted from the engine 3 and the driving wheels 6, and that can generate electricity.

The AC motor 2 is coupled to an axle 5 via a gear 4, for example, a transmission or the like. In this way, the driving force of the AC motor 2 rotates the axle 5 via the gear 4 to thereby drive the driving wheels 6.

The DC power source 8 is an electricity storage device that can charge and discharge electricity, for example, a secondary battery such as a nickel metal hydride battery or a lithium ion battery, and an electric double-layer capacitor. The DC power source 8 is connected to an inverter 12 (see FIG. 2) of the electric motor control device 10, that is, the DC power source 8 is so constructed as to supply electricity to the AC motor 2 and to be supplied with electricity from the AC motor 2 via the inverter 12.

A vehicle control circuit 9 is constructed of a microcomputer and the like and is provided therein with a CPU, a ROM, an I/O, and a bass line for connecting these elements, all of which are not shown in the drawings. The vehicle control circuit 9 controls the whole of the electric vehicle by software processing, which is performed by executing previously stored programs by the CPU, and by hardware processing, which is performed by a dedicated electronic circuit.

The vehicle control circuit 9 is so constructed as to be able to acquire signals from various kinds of sensors and switches such as an accelerator signal from an accelerator sensor, a brake signal from a brake switch, and a shift signal from a shift switch, all of which are not shown in the drawings. Further, the vehicle control circuit 9 detects a driving state of the vehicle on the basis of these acquired signals and outputs a torque command value trq* responsive to the driving state to the electric motor control device 10. Further, the vehicle control circuit 9 outputs a command signal to an engine control circuit (not shown) for controlling the drive of the engine 3.

Figure 2:
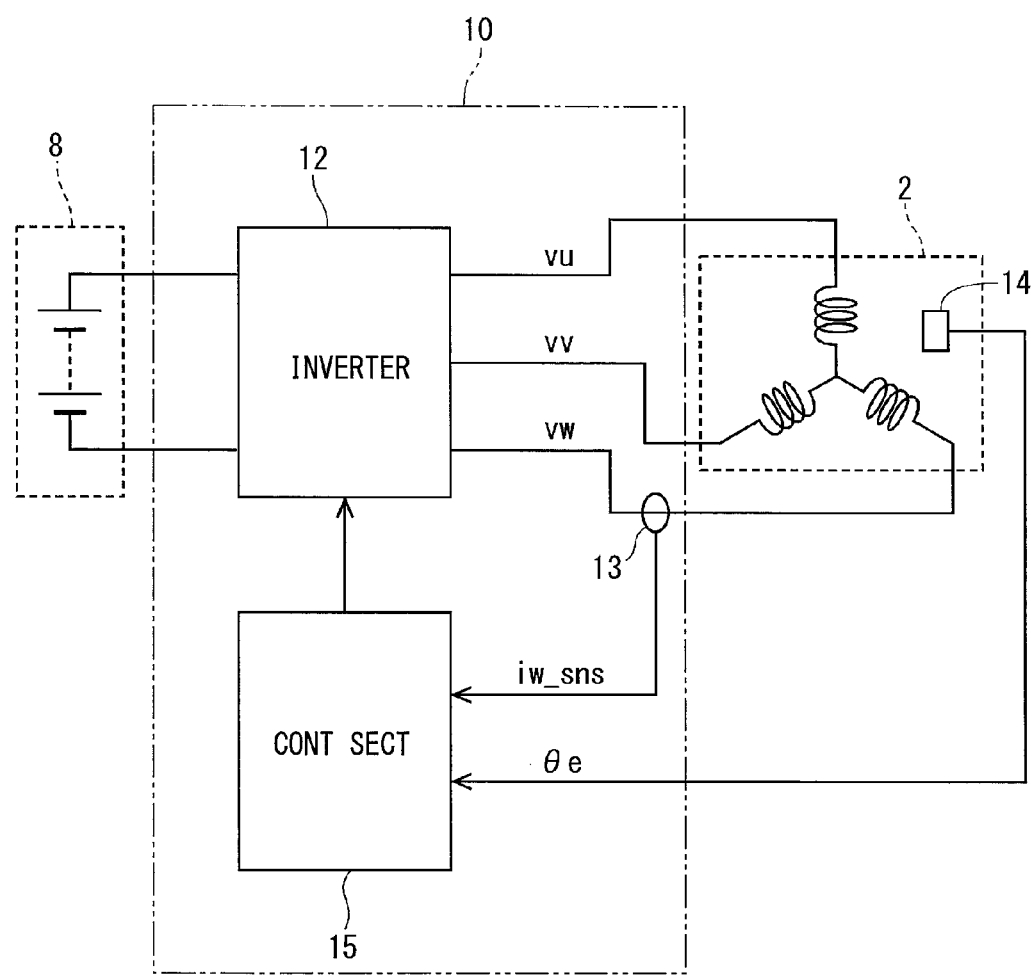
FIG. 2 is a general construction diagram to show the control device of the AC motor according to the first embodiment to the third embodiment of the present disclosure.

As shown in FIG. 2, the electric motor control device 10 includes the inverter 12, a current sensor 13, and a control section 15 as "a controller".

The inverter 12 has voltage impressed thereon as an inverter input voltage VH, the voltage being voltage to which DC voltage of the DC power source 8 is boosted by a boost converter (not shown). The inverter 12 has six switching elements (not shown) connected in a bridge mode. As to the switching element, for example, an IGBT (Insulated Gate Bipolar Transistor), a MOS (Metal Oxide Semiconductor) transistor, and a bipolar transistor can be used for the switching element. The switching elements are switched on and off on the basis of PWM signals UU, UL, VU, VL, WU, WL outputted from a PWM signal generation part 25 of the control section 15. In this way, the inverter 12 controls three phase AC voltages vu, w, vw to be impressed on the AC motor 2. When the AC motor 2 has the three phase AC voltages vu, w, vw, which are generated by the inverter 12, impressed thereon, the AC motor 2 has its drive controlled.

The current sensor 13 is provided in any one phase of the AC motor 2. A phase having the current sensor 13 provided therein is referred to as "a sensor phase". The current sensor 13 senses a phase current of the sensor phase and outputs a current sensed value to the control section 15. "The current sensed value of the sensor phase" is referred to as "a sensor value".

In the present embodiment, descriptions will be made on the assumption of a construction in which the current sensor 13 is provided in a W phase. That is, "a W phase" is the same meaning as "a sensor phase", and "a sensor value iw_sns of the W phase" corresponds to "a current sensed value of the sensor phase". Further, a W phase axis in three phase coordinates corresponds to "an axis of the sensor phase". In this regard, in the other embodiment, a U phase or a V phase may be the sensor phase.

A rotation angle sensor 14 is provided near a rotor (not shown) of the AC motor 2 and senses an electric angle θe and outputs a sensed electric angle θe to the control section 15. Moreover, the number of revolutions N of the rotor of the AC motor 2 is calculated on the basis of the electric angle θe sensed by the rotation angle sensor 14. Hereinafter, "the number of revolutions N of the rotor of the AC motor 2" is simply referred to as "the number of revolutions N of the AC motor 2".

The rotation angle sensor 14 of the present embodiment is a resolver, but in the other embodiment, the rotation angle sensor 14 may be another kind of sensor, for example, a rotary encoder.

The control section 15 is constructed of a microcomputer and the like and is provided therein with a CPU, a ROM, an I/O, and a bass line for connecting these elements, all of which are not shown in the drawings. The control section 15 controls the movement of the AC motor 2 by software processing, which is performed by executing previously stored programs by the CPU, and by hardware processing, which is performed by a dedicated electronic circuit.

According to the number of revolutions N of the AC motor 2 based on the electric angle θe sensed by the rotation angle sensor 14 and a torque command value trq* from the vehicle control circuit 9, the electric motor control device 10 drives the AC motor 2 as an electric motor to make the AC motor 2 perform a powering operation, whereby the AC motor 2 consumes electricity, or drives the AC motor 2 as a generator to make the AC motor 2 perform a regenerating operation, whereby the AC motor generates electricity. Specifically, according to the number of revolutions N and whether the torque command value trq* is plus or minus, the electric motor control device 10 switches the movement of the AC motor 2 into the following four patterns:

<1. Normal rotation/powering operation> when the number of revolutions N is plus and the torque command value trq* is plus, the AC motor 2 consumes electricity;

<2. Normal rotation/regenerating operation> when the number of revolutions N is plus and the torque command value trq* is minus, the AC motor 2 generates electricity;

<3. Reverse rotation/powering operation> when the number of revolutions N is minus and the torque command value trq* is minus, the AC motor 2 consumes electricity; and <4. Reverse rotation/regenerating operation> when the number of revolutions N is minus and the torque command value trq* is plus, the AC motor 2 generates electricity.

When the number of revolutions N>0 (normal rotation) and the torque command value trq*>0, or the number of revolutions N<0 (reverse rotation) and the torque command value trq*<0, the inverter 12 converts the DC electricity supplied from the DC power source 8 to an AC electricity by the switching operation of the switching elements and supplies the AC electricity to the AC motor 2, thereby driving the AC motor 2 in such a way as to output torque (to perform a powering operation).

On the other hand, when the number of revolutions N>0 (normal rotation) and the torque command value trq*<0, or the number of revolutions N<0 (reverse rotation) and the torque command value trq*>0, the inverter 12 converts the AC electricity generated by the AC motor 2 to a DC electricity by the switching operation of the switching elements and supplies the DC electricity to the DC power source 8, whereby the AC motor 2 performs a regenerating operation.

Hereinafter, before describing a construction and an operation specific to the embodiments of the present disclosure, points of attention relating to the interpretation of technical terms will be described in advance.

At the time of saying that the current of the dq axis current commands id*, iq*, the sensor value iw_sns, or the like is "zero", a term of "zero" includes not only a value of strict 0 [A] but also a value within the substantially same range as 0 [A] in consideration of the sensing error and the resolution of a device. Moreover, at the time of saying that the current is "not zero", a phrase of "not zero" does not mean to exclude only a value of strict 0 [A] but means a value outside the substantially same range as 0 [A].

Further, unless specifically referred to, in the following descriptions, it is assumed that at least one of a d axis current command id* and a q axis current command iq* is not zero. In other words, it is assumed that an amplitude Ia of the current command vector is not zero. Hereinafter, "a d axis current and a q axis current" are expressed by "dq axis currents", as required.

At the time of saying that a positional relationship on the coordinates is "orthogonal", a term of "orthogonal" includes not only a case in which an intersection angle is strict 90 [°] but also a case in which an intersection angle is within a given range near 90 [°]. Further, at the time of saying that a positional relationship on the coordinates is "non-orthogonal", a term of "non-orthogonal" does not mean to exclude only a case in which an intersection angle is strict 90 [°] but means a case in which an intersection angle is outside a given range near 90 [°].

At the time of saying that the rotation of the rotor of the AC motor 2 is "stopped", it means not only a case in which the number of revolutions N is strict 0 [rpm] but also a low rotation state in which the number of revolutions N is not more than a given number of revolutions. For example, when an electric angle period is sufficiently large as compared with a control period or a sampling interval Ts (see FIG. 3) of the current sensor 13, it is said that "the rotation of the rotor is stopped". Further, a term of "stop" in the phrase of "when something is stopped" and "when something is in a stop state" is interpreted in the same way as this.

In the embodiments of the present disclosure, the current sensor 13 is provided in only one phase. Hence, as compared with a construction in which the current sensors are provided in two phases or three phases, the number of current sensors can be reduced and a construction near three phase output terminals of the inverter 12 can be reduced in size and the control system of the AC motor 2 can be reduced in cost.

On the other hand, when current to be passed through the AC motor 2 is controlled, it is necessary to perform "a one-phase control" based on the sensor value of the one phase. Although several methods are proposed for the one-phase control, in any method, actual machine information tends to be scarce as compared with a two-phase control based on the sensor values of two phases.

Difficulties of the one-phase control at the time of low rotation will be described with reference to FIGS. 3A, 3B, 3C and FIGS. 4A, 4B.

Figure 3A:
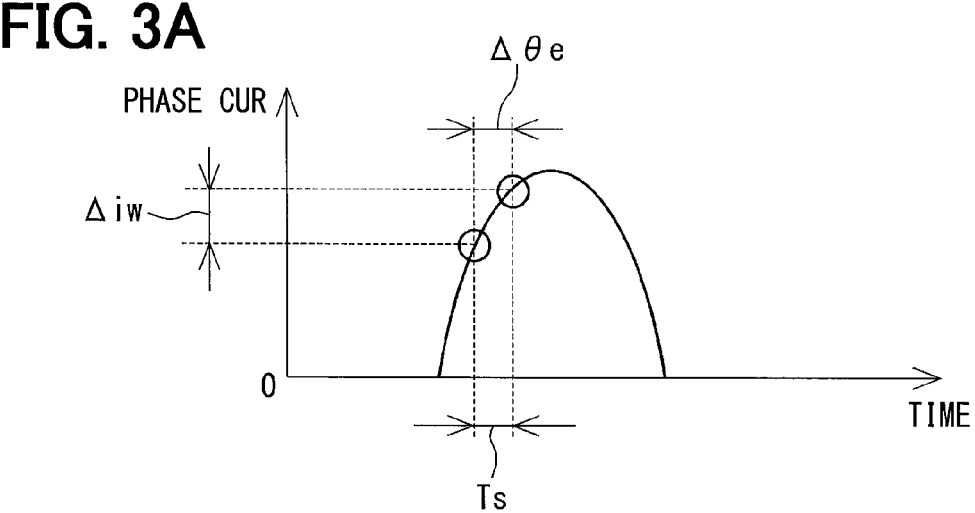
FIGS. 3A, 3B, and 3C are schematic charts of a phase current waveform to illustrate a difficulty of a one-phase control at the time when an AC motor is rotated at a low number of revolutions.
Figure 3B:
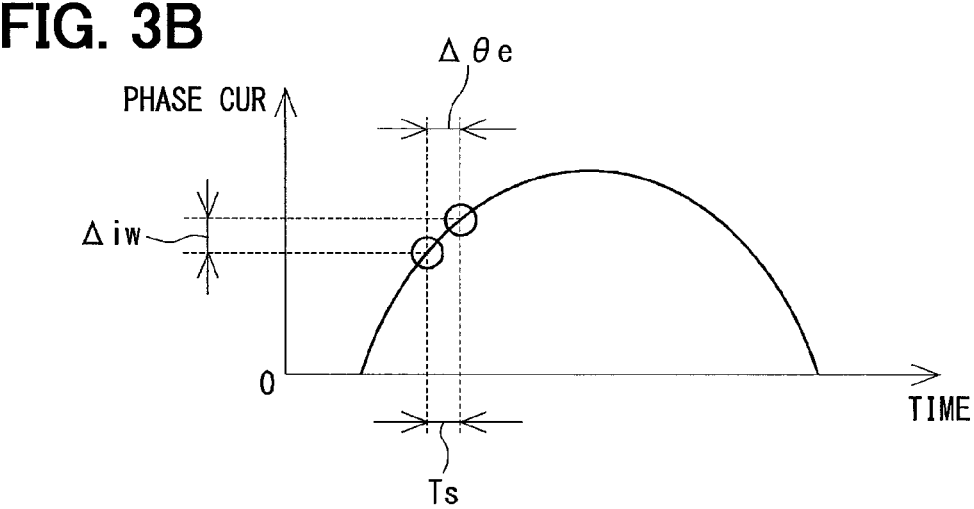
Figure 3C:
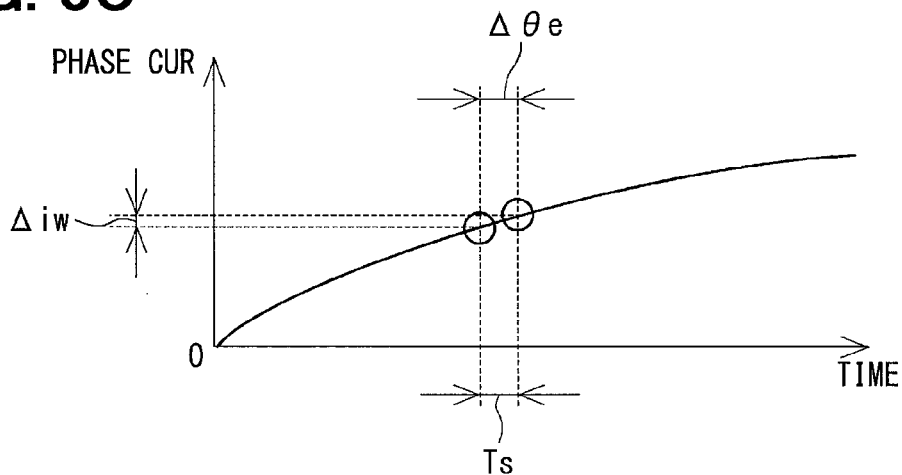

FIGS. 3A, 3B, 3C are charts to schematically show the relationship between the sampling interval Ts of the current sensor 13 and an electric angle movement Δθe and a current change Δiw of a W phase current waveform for cases where the number of revolutions N is different. FIGS. 3A, 3B, 3C show phase current waveforms at the time of high rotation, middle rotation, and low rotation, respectively. Here, each of "the high rotation, the middle rotation, and the low rotation" is used only in a relative meaning and does not mean a specific number of revolutions. Moreover, the sampling interval Ts is assumed to be constant irrespective of the number of revolutions N.

At the time of the high rotation, the electric angle movement Δθe and the current change Δiw are comparatively large values and hence can well reflect actual machine information, which hence makes it possible to perform the one-phase control of comparatively high accuracy.

At the time of the middle rotation, the electric angle movement Δθe and the current change Δiw at the sampling interval Ts are further deceased than at the time of the high rotation and hence the actual machine information is rather scarce, which hence reduces the accuracy of the one-phase control.

At the time of the low rotation, the electric angle movement Δθe and the current change Δiw are still further decreased and hence the current change Δiw becomes close to zero. For this reason, the actual machine information becomes scarcer, which hence causes a case in which the one-phase control cannot be performed.

Figure 4A:
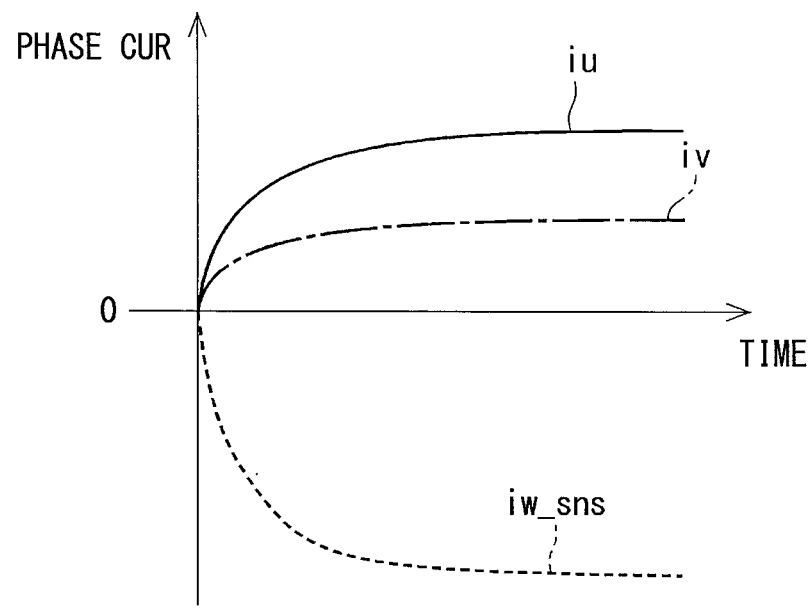
FIGS. 4A and 4B are schematic charts to illustrate an operation of making a phase current a direct current at the time when an AC motor is stopped.

Further, when the number of revolutions N of the AC motor 2 becomes zero, that is, the AC motor 2 is stopped, the electric angle θe becomes constant. Further, when it is assumed that also a current command phase φ is constant, as shown in FIG. 4A, the current of each phase becomes constant, that is, the current is made direct current. In FIG. 4A, a U phase current iu and a V phase current iv show actual currents and are not actually sensed. A W phase current is the sensor value iw_sns.

In this regard, an equation (1) holds true for the phase currents of three phases from the Kirchhoff's law.

$$iu+iv+iw=0 \quad (1)$$

Figure 4B:
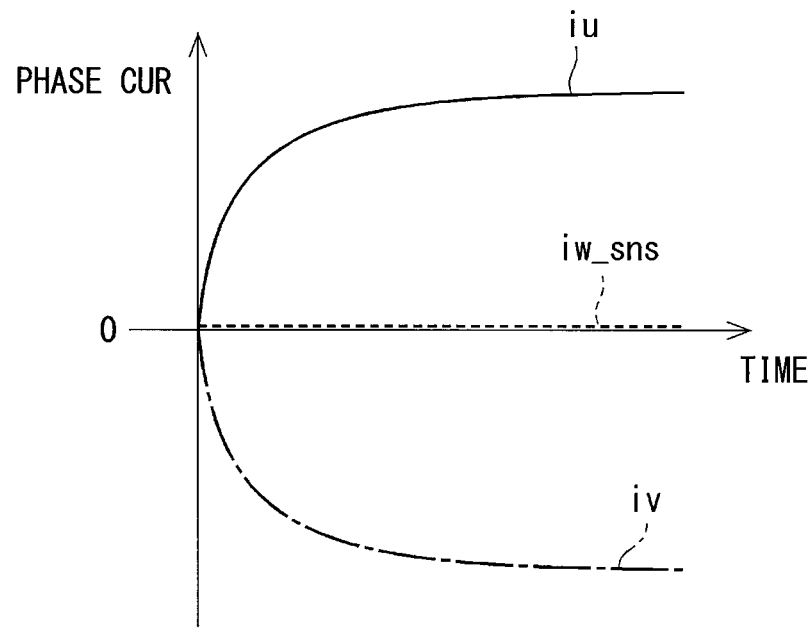

Further, as shown in FIG. 4B, when the AC motor 2 is stopped, there is a case in which a sensor value iw_sns is always made zero by the electric angle θe and the current command phase φ. In what case the sensor value iw_sns is made zero will be later described in detail.

Here, as described above, "stop" includes a low rotation state close to stop. In a case in which the AC motor 2 is very slowly rotated, it can be guessed that the sensor value iw_sns will be outside a range of "zero". Hence, the expression of "is always made zero" does not mean "is made zero for ever" but means "a state of zero continues for a sufficiently long time with respect to a control period".

Further, as described above, a case in which both of the d axis current command id* and the q axis current command iq* are zero is not taken into account. In other words, when both of the d axis current command id* and the q axis current command iq* are zero, a current amplitude becomes zero and hence all of three phase currents iu, iv, iw become zero, so that the sensor value iw_sns naturally becomes zero. This case is not taken into account. Unless specifically mentioned, it is assumed that "the sensor value iw_sns is zero" means, as shown in FIG. 4B, a state in which the U phase current iu and the V phase current iv are not zero and where the sensor value iw_sns of the W phase is zero.

In this way, when the sensor value iw_sns is always sensed to be zero, for example, when a feedback control is performed by the use of the technique disclosed in the patent document 1, dq axis current estimated values obtained by dq transforming the value of zero that is the sensor value iw_sns of one phase and the current estimated values of the other two phases correspond to the dq axis current commands id*, iq*. Hence, this results in feeding back the dq axis current commands id*, iq* to the dq axis current commands as they are and hence the dq axis current deviations Δid, Δiq become zero, which brings about the same state as the feedback control is not performed.

As described above, when the AC motor 2 is stopped, there is presented a difficulty that in the one phase control, the drive control of the AC motor 2 becomes unstable.

[Construction of the Control Section and Operation and Effect Thereof]

Figure 13:
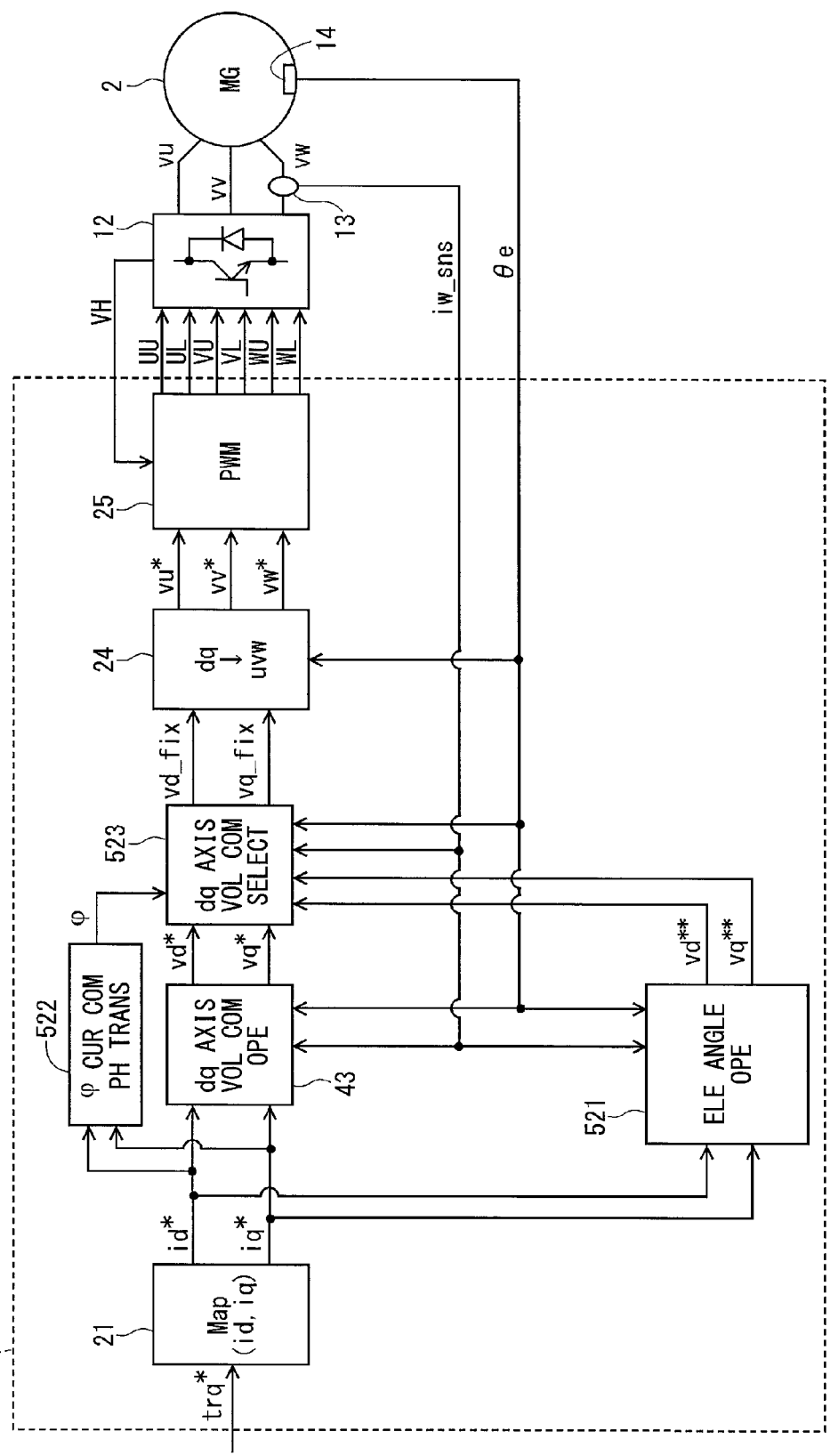
FIG. 13 is a block diagram to show a construction of a control section of a control device of an AC motor according to the third embodiment of the present disclosure.

Hence, the electric motor control device 10 according to the embodiment of the present disclosure is characterized by the construction of the control section 15 for making it possible to sense the sensor value iw_sns to be not zero irrespective of the electric angle θe and the current command phase φ when the AC motor 2 is stopped. Hereinafter, the construction of the control section 15 and the operation and effect thereof will be described for each of a first embodiment to a third embodiment. Reference characters of the control sections of the first embodiment, the second embodiment, and the third embodiment are made 151 (FIG. 5), 152 (FIG. 11), and 153 (FIG. 13).

First Embodiment

The construction of the control section 151 of the first embodiment will be described with reference to FIG. 5 to FIG. 9.

Figure 5:
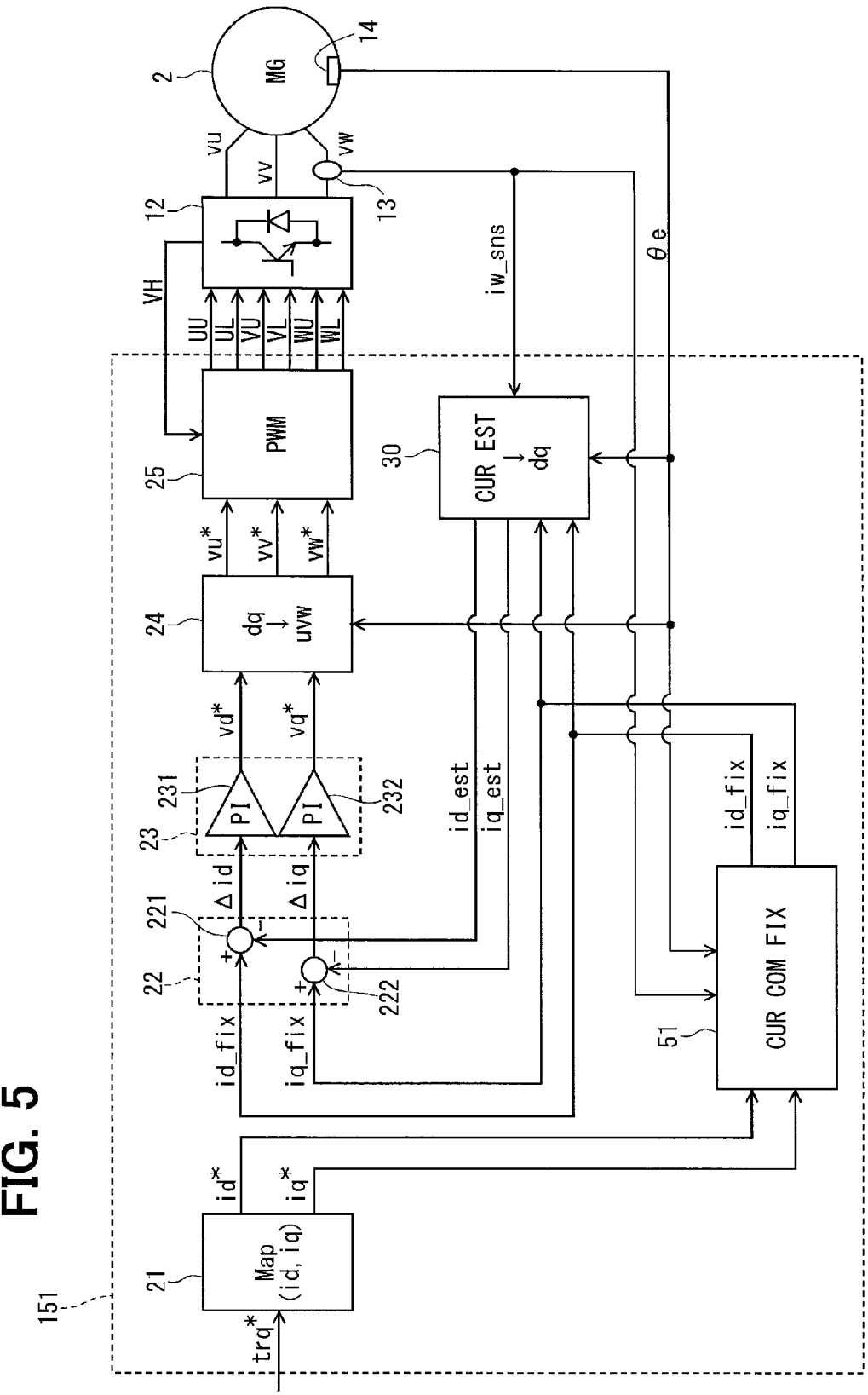
FIG. 5 is a block diagram to show a construction of a control section of the control device of the AC motor according to the first embodiment of the present disclosure.

As shown in FIG. 5, the control section 151 includes a current command operation part 21, a current subtracter 22, a PI operation part 23, an inverse dq transformation part 24, a PWM signal generation part 25, a current estimation part 30, and a current command fixing part 51.

The current command operation part 21 operates the d axis current command id* and the q axis current command iq* on the rotating coordinate system (d–q coordinate system) of the AC motor 2 on the basis of the torque command value trq* acquired from the vehicle control circuit 9. In the present embodiment, the d axis current command id* and the q axis current command iq* are operated with reference to a map stored in advance but may be operated by a mathematical formula or the like in the other embodiment.

Figure 6:
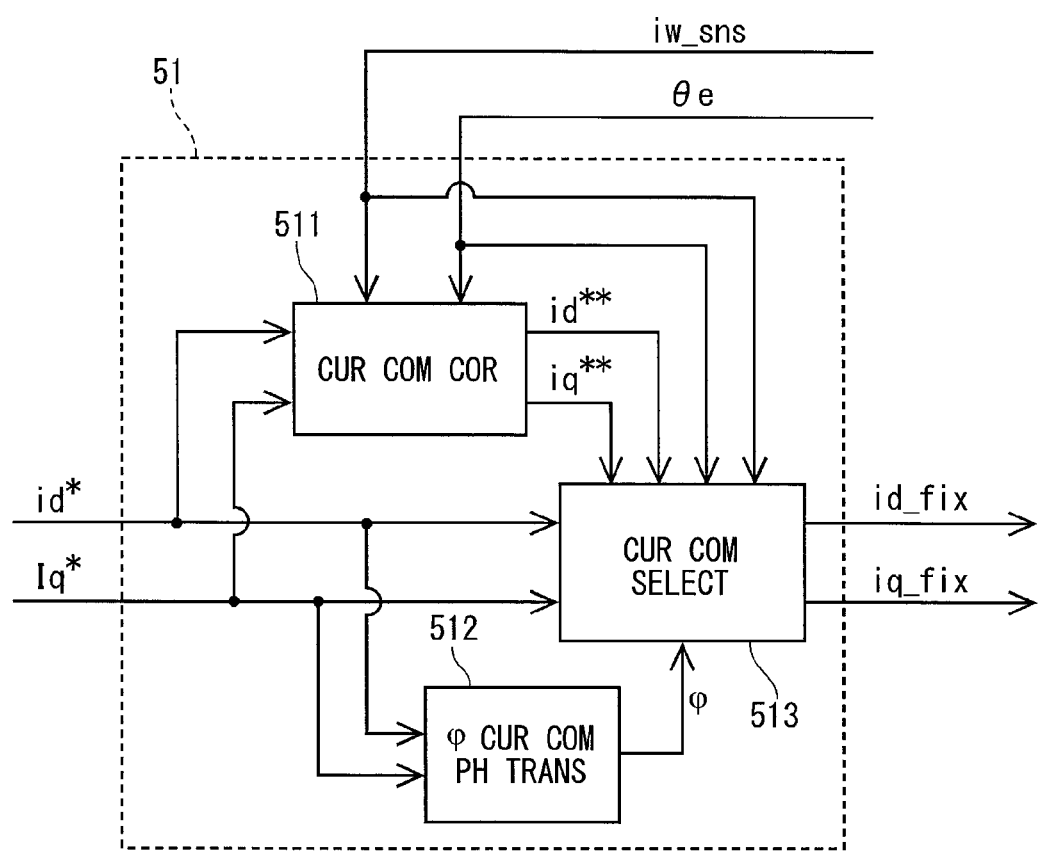
FIG. 6 is a detailed block diagram of a current command fixing part in FIG. 5.

The dq axis current commands id*, iq* are not directly inputted to the current subtracter 22 but are once inputted to the current command fixing part 51. As shown in FIG. 6, the current command fixing part 51 includes a current command correction part 511, a current command phase transformation part 512, and a current command selection part 513.

The current command correction part 511 determines "whether or not a current command vector made of the dq axis current commands id*, iq* is orthogonal to a W phase axis" (referred to as "determination of orthogonality", as will be described later). When the current command correction part 511 determines that the current command vector of the dq axis current commands id*, iq* is orthogonal to the W phase axis, the current command correction part 511 performs "non-orthogonality processing". Further, the current command correction part 511 corrects the dq axis current commands id*, iq* to thereby operate dq axis corrected current commands id, iq in the non-orthogonality processing.

The current command phase transformation part 512 outputs the current command phase φ, which is obtained by transforming the initial dq axis current commands id*, iq*, to the current command selection part 513.

The current command selection part 513 acquires the information of the electric angle θe, the current command phase φ, and the sensor value iw_sns and selects the initial dq axis current commands id*, iq* or the dq axis corrected current commands id, iq and outputs the initial dq axis current command id*, iq* or the dq axis corrected current command id, iq, which are selected, as dq axis current command fixed values id_fix, iq_fix. When the current command correction part 511 performs the non-orthogonality processing, the current command selection part 513 selects the dq axis corrected current commands id, iq.

The dq axis current command fixed values id_fix, iq_fix selected by the current command selection part 513 are inputted to the current subtracter 22 and the current estimation part 30. In the following will be described a construction relating to a current feedback control based on the dq axis current command fixed values id_fix, iq_fix.

The current subtracter 22 includes a d axis current subtracter 221 and a q axis current subtracter 222. The d axis current subtracter 221 calculates a d axis current deviation Δid that is a difference between the d axis current estimated value id_est, which is calculated and fed back by the current estimation part 30, and the d axis current command fixed value id_fix. Further, the q axis current subtracter 222 calculates a q axis current deviation Δiq that is a difference between the q axis current estimated value iq_est, which is calculated and fed back by the current estimation part 30, and the q axis current command fixed value iq_fix.

The PI operation part 23 includes a d axis PI operation part 231 and a q axis PI operation part 232. The d axis PI operation part 231 calculates a d axis voltage command vd* by a PI operation in such a way that the d axis current deviation Δid converges to zero so as to make the d axis current estimated value id_est follow the d axis current command id*. Further, the q axis PI operation part 232 calculates a q axis voltage command vq* by the PI operation in such a way that the q axis current deviation Δiq converges to zero so as to make the q axis current estimated value iq_est follow the q axis current command iq*.

The inverse dq transformation part 24 transforms the dq axis current voltage commands vd*, vq* to a U phase voltage command vu*, a V phase voltage command w*, a W phase voltage command vw* on the basis of the electric angle θe acquired from the rotation angle sensor 14.

The PWM signal generation part 25 calculates the PWM signals UU, UL, VU, VL, WU, WL relating to the switching on and off of the switching elements of the inverter 12 on the basis of the three phase voltage commands vu*, w*, vw* and the inverter input voltage VH to be impressed on the inverter 12.

Then, the switching elements of the inverter 12 are switched on and off on the basis of the PWM signals UU, UL, VU, VL, WU, WL, whereby the three phase voltages vu, w, vw are generated. The three phase voltages vu, w, vw are impressed on the AC motor 2, whereby the drive of the AC motor 2 is controlled in such a way as to output torque according to the torque command trq*.

The current estimation part 30 has the sensor value iw_sns of one phase, the electric angle θe, and the dq axis current command fixed values id_fix, iq_fix inputted thereto, the dq axis current command fixed values id_fix, iq_fix being outputted from the current command fixing part 51. The current estimation part 30 estimates the dq axis current estimated values id_est, iq_est on the basis of these pieces of information and feeds back the dq axis current estimated values id_est, iq_est to the current subtracter 22.

The current estimation part 30 described by way of example in the present embodiment estimates the dq axis current estimated values id_est, iq_est by the use of the technique of the patent document 1 (JP-A-2008-86139) of a related art. That is, the current estimation part 30 makes the current command values of the U phase and the V phase among the three phase current command values, which are obtained by inversely dq transforming the dq axis current command fixed values id_fix, iq_fix, the current estimated values iu_est, iv_est of the U phase and the V phase. Then, the current estimation part 30 dq transforms the current estimated values iu_est, iv_est of the U phase and the V phase and the sensor value iw_sns of the W phase to thereby calculate the dq axis current estimated values id_est, iq_est.

In a construction in which the current command fixing part 51 is not included and in which the dq axis current commands id*, iq* are directly inputted to the current subtracter 22, when the sensor value iw_sns is always sensed to be zero, the dq axis current estimated values id_est, iq_est, which are obtained by dq transforming the sensor value that is zero and the current estimated values of the other two phases by the current estimation part 30, results in corresponding to the dq axis current commands id*, iq*. Hence, the dq axis current commands id*, iq* result in being fed back as they are, which brings about the same state as a state in which the feedback control is not performed.

Here, the method by which the current estimation part 30 estimates the current value of other one phase or other two phases on the basis of the inputted information described above includes a method other than the method described above, and any of the estimation methods may be employed. The other estimation methods will be described as "other embodiments" at the end of the specification.

Next, the determination of orthogonality and the non-orthogonalization processing performed by the current command correction part 511 will be described with reference to FIGS. 7A, 7B As described above, depending on the position in which the AC motor 2 is stopped, there is a case in which although at least one of the dq axis current commands id*, iq* is not zero, the sensor value iw_sns is always sensed to be zero. This state is shown on the three phase coordinates, as shown in FIG. 7A.

Figure 7A:
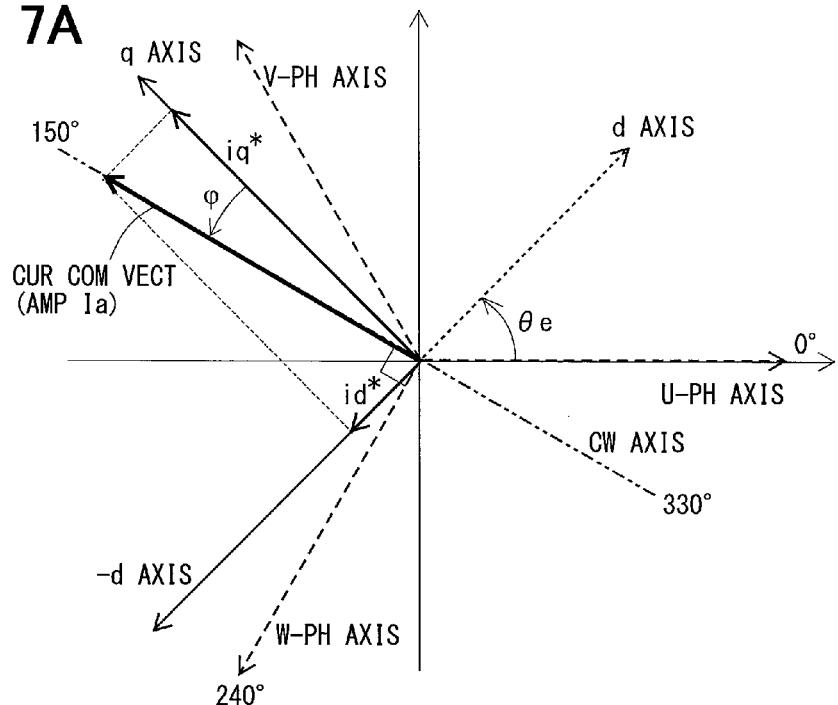
FIGS. 7A and 7B are charts to illustrate a current command phase operation that is non-orthogonalization processing according to the first embodiment and the second embodiment of the present disclosure.

In FIG. 7A, the electric angle θe based on the U phase axis is defined as an angle in a counterclockwise direction from 0 [°]. A W phase axis is shifted by an electric angle of 240 [°] with respect to the U phase axis. Further, "the phase φ" of the current command vector of an amplitude Ia, which is made of a d axis component id* and a q axis component iq*, is defined as a phase in a counterclockwise direction from a q axis on the dq coordinates. A phase angle of the current command vector based on the U phase axis is shown by (θe+φ+90 [°]) by the use of the electric angle θe of a (+d) axis based on the U phase axis.

In this regard, when a base axis is not specified, the phase angle of the current command vector can be generally expressed by (θe+φ+C) by the use of a constant C.

Here, when a component in a W phase axis direction of the current command vector is zero, the sensor value iw_sns of the W phase is sensed to be zero. In short, it is when the current command vector is positioned on a CW axis orthogonal to the W phase axis that the sensor value iw_sns is sensed to be zero. Specifically, it is when the phase angle is near 150 [°] or near 330 [°] that the sensor value iw_sns is sensed to be zero.

In other words, when the AC motor 2 is stopped in a state in which the current command vector is orthogonal to the W phase axis, the sensor value iw_sns is always sensed to be zero. For this reason, in the construction in which the current estimation part 30 feeds back the current estimated values by the use of the technique disclosed in the patent document 1, as described above, there is brought about the same state as the state in which the feedback control is not performed, which hence makes the drive control of the AC motor 2 unstable.

Hence, the electric motor control device 10 according to the present disclosure determines whether or not the current command vector is orthogonal to the W phase axis on the three phase coordinates in the state in which the AC motor 2 is stopped. When the electric motor control device 10 determines that the current command vector is orthogonal to the W phase axis on the three phase coordinates, the electric motor control device 10 performs "the non-orthogonalization processing". In the first embodiment and the next second embodiment, the electric motor control device 10 "operates the current command phase φ" to thereby perform "the non-orthogonalization processing".

Figure 7B:
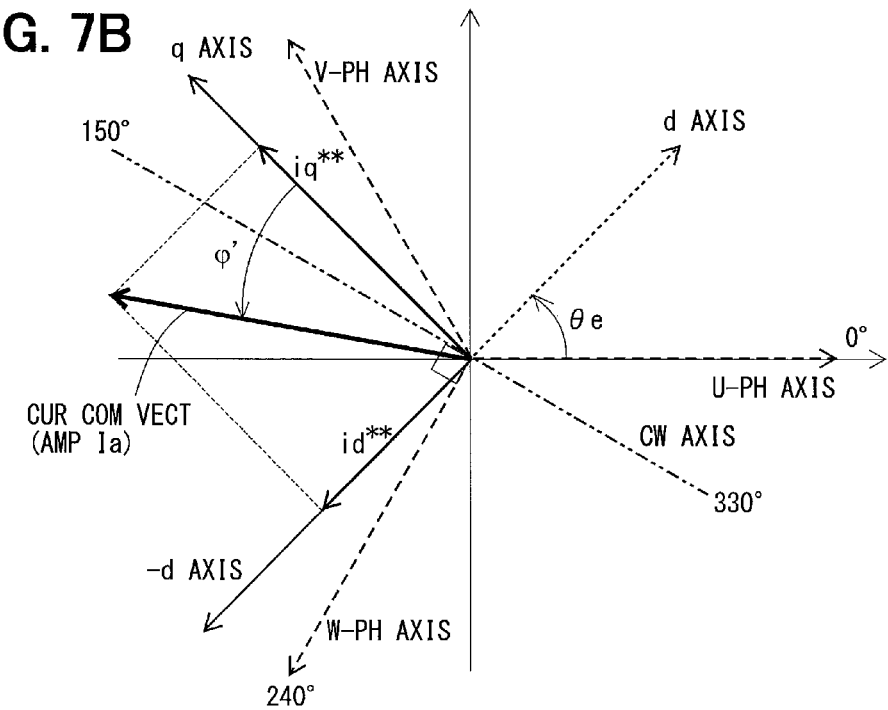
Figure 8A:
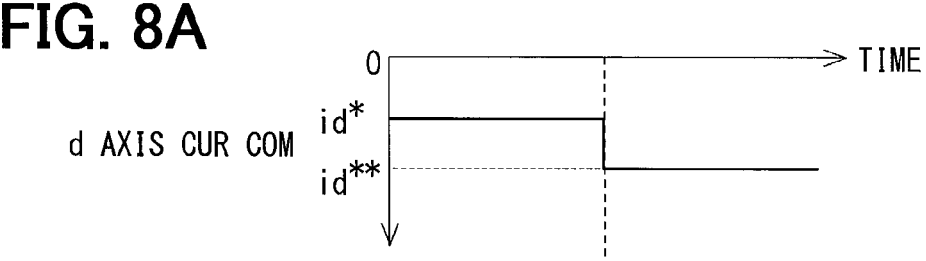
FIGS. 8A to 8E are time charts of the current command phase operation.
Figure 8B:
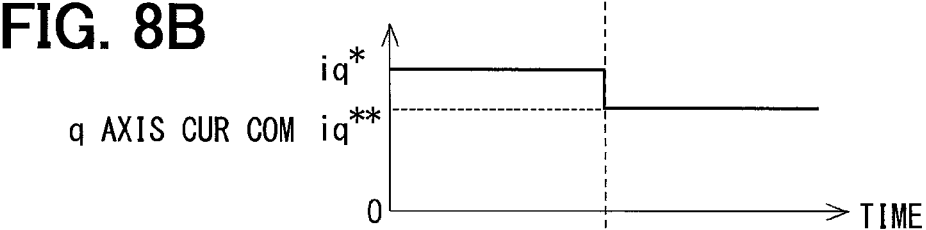
Figure 8C:
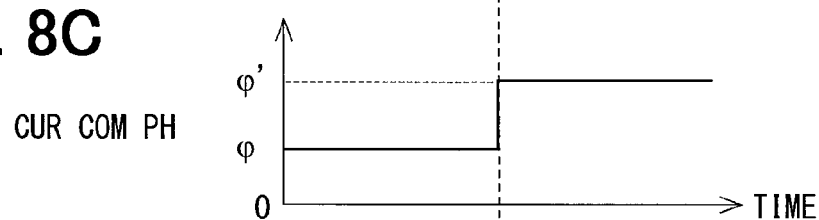
Figure 8D:
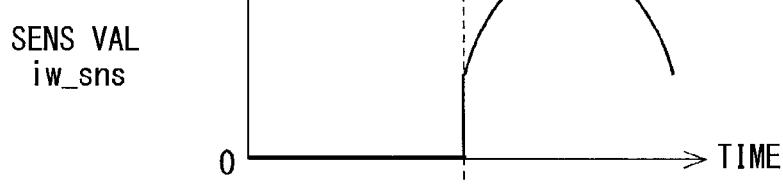
Figure 8E:
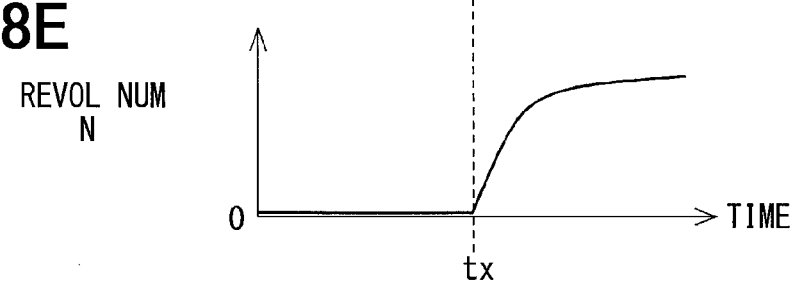

"To operate the current command phase φ" means to advance or to delay the phase of the current command vector from φ in FIG. 7A to φ' in FIG. 7B. The current command vector shown in FIG. 7B is made of a d axis component id and a q axis component iq and a phase angle is expressed by (θe+φ+90 [°]). The electric angle θe is the same as that before the operation. The current command vector shown in FIG. 7B is shifted from the CW axis orthogonal to the W phase axis and hence is not orthogonal to the W phase axis.

In this way, when the current command vector is orthogonal to the W phase axis, the current command correction part 511 of the current command fixing part 51 corrects the dq axis current commands id*, iq* to the dq axis current commands id, iq to thereby operate the current command phase from φ to φ', thereby making the current command vector non-orthogonal to the W phase axis.

When it is assumed that an angle of the CW axis orthogonal to the W phase axis is 0 [°], when the current command vector is positioned on the CW axis, a component in a W phase axis direction of the current command vector is expressed in the following manner.

$$Ia \times \sin(0\,[°]) = 0\,[A]$$

For example, when the phase φ of the current command vector is shifted by 30 [°] from this state, the component in the W phase axis direction of the current command vector is expressed in the following manner.

$$Ia \times \sin(30\,[°]) = (1/2)Ia\,[A]$$

Hence, the sensor value iw_sns that is not zero can be sensed.

Subsequently, FIGS. 8A to 8E are time charts to show a change from a state shown in FIG. 7A to a state shown in FIG. 7B by the non-orthogonalization processing.

FIGS. 8A to 8E show the following: a state before a switching timing tx in a time axis shown in FIGS. 8A to 8E shows a state before the non-orthogonalization processing, which corresponds to FIG. 7A; and at the switching timing tx, the non-orthogonalization processing corresponding to FIG. 7B is performed.

Before the switching timing tx, as shown in FIG. 7A, the AC motor 2 is stopped in the state in which the current command vector is orthogonal to the W phase axis, so that the sensor value iw_sns is always sensed to be zero. Hence, although neither of the d axis current command id* and the q axis current command iq* are zero, the AC motor 2 is not driven and hence the number of revolutions N is held at zero.

At the switching timing tx, the dq axis current commands id*, iq* are corrected to the dq axis current commands id, iq and the current command phase is operated from φ to φ'. In this way, the current command vector is made non-orthogonal to the W phase axis and hence the sensor value iw_sns that is not zero can be sensed.

Then, the current estimation part 30 can estimate and feed back the dq axis current estimated values id_est, iq_est, on which the sensor value iw_sns is reflected. Hence, voltage based on the adequate dq axis voltage commands vd*, vq* can be impressed on the inverter 12 on the basis of the current commands id*, iq* and hence the AC motor 2 can be driven. For this reason, after the switching timing tx, the number of revolutions N is increased and the sensor value iw_sns is changed in a sine waveform.

Then, when the current command vector becomes non-orthogonal to the W phase axis, or the number of revolutions N is not less than a given number of revolutions, the current command selection part 513 selects the initial dq axis current commands id*, iq* and outputs the initial dq axis current commands id*, iq* as the dq axis current command fixed values id_fix, iq_fix, whereby the drive control of the AC motor 2 can be returned to the normal control.

Further, it is preferable that the control section 151 performs the operation of the dq axis current commands id*, iq* for a normal control and the operation of the dq axis corrected current commands id, iq always in parallel. In this way, when the current command selection part 513 switches the selection of the current commands, the control section 151 can previously take in the dq axis current commands after the switching. Further, in order to avoid a sudden change at the time of the switching the dq axis current commands, the current command selection part 513 may include a filter.

In the meantime, in FIGS. 7A and 7B, the amplitude Ia of the current command vector before and after performing the operation of the current command phase φ are shown in the same level. However, even if the amplitude Ia is the same, when the current command phase φ is changed, torque to be generated will be changed. Hence, it is more preferable to operate the current command phase φ and to appropriately change the amplitude Ia so as to prevent the torque from being changed.

Next, a preferable construction relating to the operation of the current command phase φ will be described with reference to FIG. 9.

Figure 9:
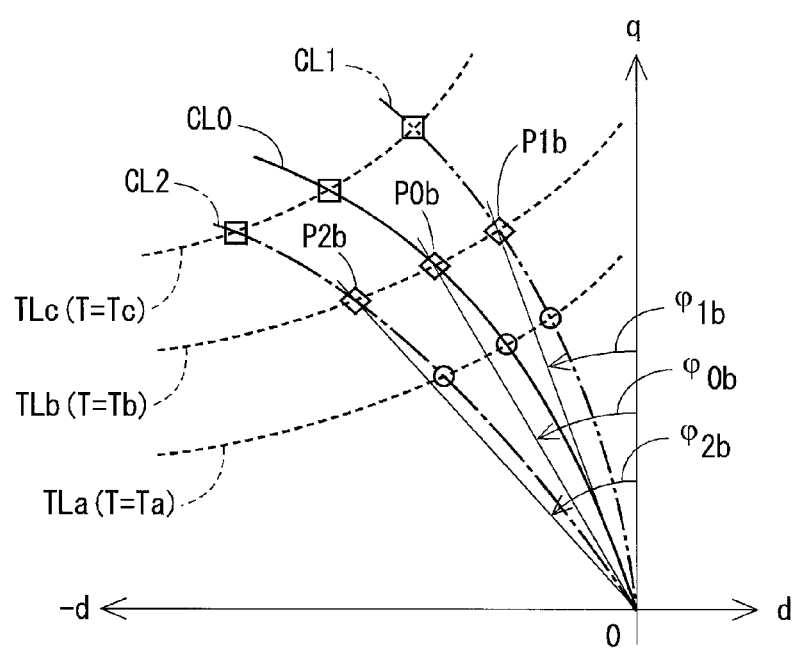
FIG. 9 is a chart to illustrate an example in which a current command vector is moved along a line of equal torque in the current command phase operation.

In FIG. 9, TLa, TLb, TLc show the lines of equal torque which correspond to torque Ta, Tb, Tc respectively. The line of equal torque may be calculated from the following equation (2) or may be obtained by the following manner: an estimation map is made in which the dq axis current commands id*, iq* are parameters; and the amplitude of the dq axis current command vector is corrected in such a way that torque estimated values based on the dq axis current commands id, iq after the phase operation becomes the initial torque.

$$T = p \times \{iq \times \psi + (Ld - Lq) \times id \times iq\} \tag{2}$$

The reference characters are as follows.
p: number of pairs of poles of AC motor
Ld, Lq: d axis self-inductance, q axis self-inductance
ψ: armature interlinkage flux of permanent magnet Further, CL0 is an initial current command line and the current command vector is appropriately changed along this line according to a change in the torque command trq*. CL1 and CL2 are current command lines assumed when the phase φ is delayed or advanced from the initial CL0.

For example, it is assumed that an initial current command vector is at a point P0b corresponding to a torque Tb on the current command line CL0 and that a phase at that time is φ0b. In the non-orthogonalization processing, the current command vector is moved to a point P1b on the line of equal torque TLb to thereby operate the phase from φ0b to φ1b. Alternatively, the current command vector is moved to a point P2b on the line of equal torque TLb to thereby operate the phase from φ0b to φ2b. By this operation, the current amplitude Ia is appropriately changed.

Figure 10:
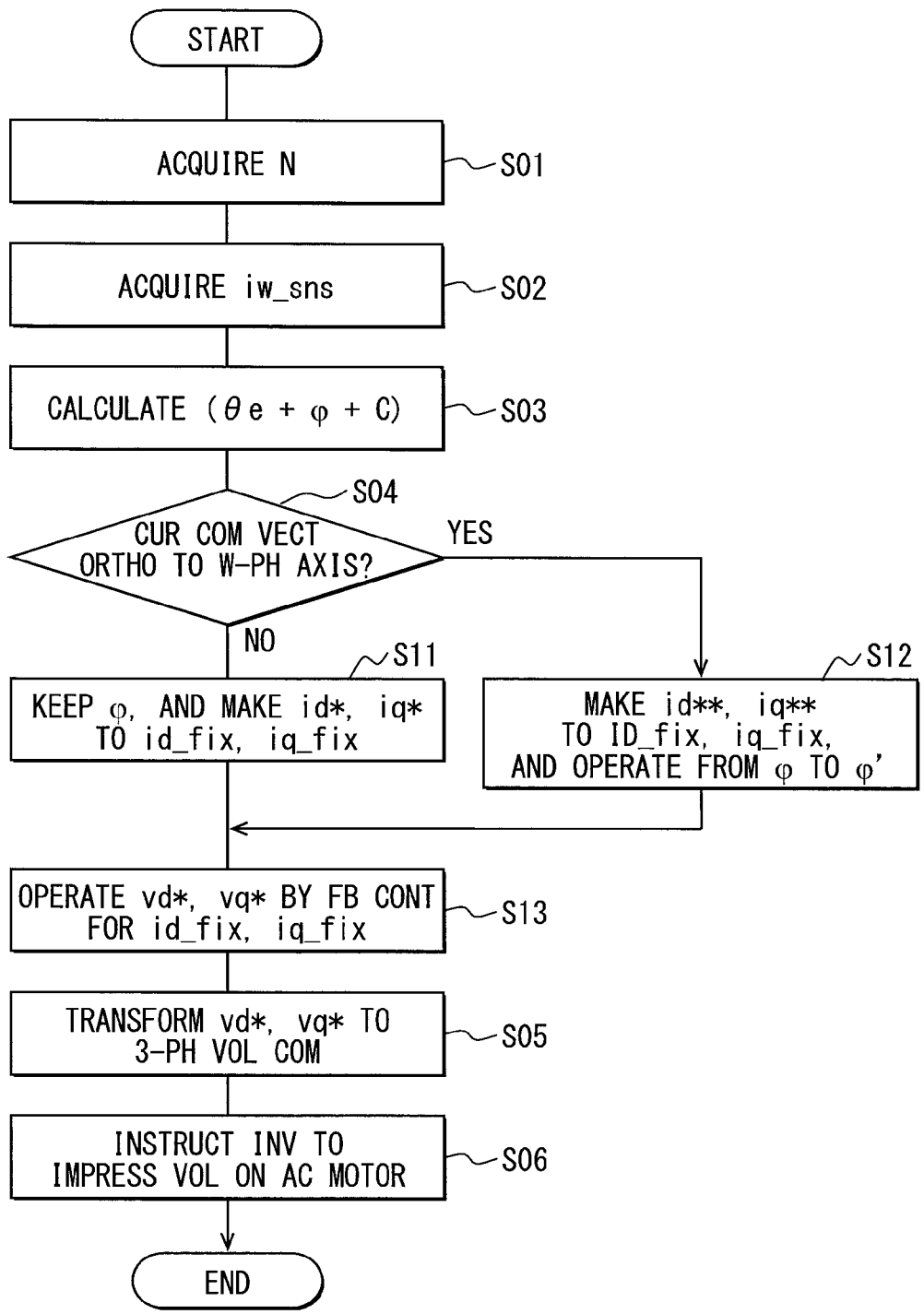
FIG. 10 is a flow chart of a control of current to be passed through the AC motor according to the first embodiment of the present disclosure.

Next, a control routine of passing current through the AC motor 2, which is performed by the control section 151, will be described with reference to a flow chart shown in FIG. 10. In the following descriptions of the flow chart, a symbol "S" means a step.

In S01, the number of revolutions N is acquired on the basis of the electric angle θe acquired from the rotation angle sensor 14. It is checked that the acquired number of revolutions N is not more than a given number of revolutions for which the non-orthogonalization processing is required. The given number of revolutions may be set according to the necessity of the non-orthogonalization.

In S02, the sensor value iw_sns is acquired from the current sensor 13.

In S03, the phase angle (θe+φ+C) of the current command vector is calculated from the electric angle θe and the phase (p of the dq axis current commands id*, iq*. In S04, "a determination of orthogonality" is made, that is, it is determined whether or not the current command vector is orthogonal to the W phase axis.

In S04, when it is determined that the current command vector is not orthogonal to the W phase axis (S04: NO), the phase φ of the initial dq axis current commands id*, iq*, which are commanded by the current command operation part 21, is kept and the dq axis current commands id*, iq* are made the dq axis current command fixed values id_fix, iq_fix. Then, the routine proceeds to S13.

On the other hand, when it is determined that the current command vector is orthogonal to the W phase axis (S04: YES), in S12, the current commands are corrected to id, iq to thereby operate the current phase from φ to φ'. Then, the dq axis corrected current commands id, iq are made the dq axis current command fixed values id_fix, iq_fix. Then, the routine proceeds to S13. Here, S12 is defined as a non-orthogonalization processing.

In S13 that is a step specific to the first embodiment, the dq axis voltage commands vd*, vq* are operated by performing the feedback control for the dq axis current command fixed values id_fix, iq_fix. In more detail, the current estimated values id_est, iq_est calculated by the current estimation part 30 are fed back to the dq axis current command fixed values id_fix, iq_fix to thereby operate the dq axis current voltage commands vd*, vq* by the PI operation in such a way that the dq axis current deviations Δid, Δiq converge to zero.

In S05, the inverse dq transformation part 24 transforms the dq axis voltage commands vd*, vq* to three phase voltage commands vu*, vv*, vw*. In S06, the three phase voltage commands vu*, w*, vw* is commanded to the inverter 12 and three phase AC voltages are impressed on the AC motor 2.

Up to this point, the control routine of passing current through the AC motor 2, which is performed by the control section 15, is finished.

The operation and effect of the electric motor control device of the present embodiment will be described.

(1) When the AC motor 2 is stopped, in the case in which the control section 151 determines that the current command vector is orthogonal to the W phase axis on the three phase coordinates, the control section 151 makes the current command vector non-orthogonal to the W phase axis. When the current command vector is orthogonal to the W phase axis, the sensor value iw_sns is always sensed to be zero. As a result, in the one phase control, the drive control of the AC motor 2 is made unstable. Hence, the control section 151 makes the current command vector non-orthogonal to the W phase axis, thereby making it possible to always sense the sensor value iw_sns, which is not zero, irrespective of the position in which the AC motor 2 is stopped. In this way, it is possible to improve the estimation accuracy of the dq axis current estimated values, in particular, when the AC motor 2 is started or is within the low rotation range and hence to stably drive the AC motor 2.

(2) In the present embodiment, the current command phase φ is operated, whereby the phase angle (θe+φ+90 [°]) of the current command vector is made non-orthogonal to the W phase axis. The electric angle θe is not operated, so that the non-orthogonalization processing can be performed without rotating the rotor of the AC motor 2.

(3) At the time of operating the current command phase φ, the current command phase φ is operated along the line of equal torque in such a way as to keep torque constant, the torque being generated on the basis of the current command vector, whereby a change in the torque can be suppressed before and after the operation of the current command phase φ. For this reason, it is possible to avoid user's feeling of strangeness. Further, for example, in a system in which the torque generated by the AC motor 2 is monitored by another control circuit (for example, microcomputer), an unintended determination of an abnormality in the torque can be avoided.

(4) The operation of the initial dq axis current commands id*, iq* in the normal control and the operation of the dq axis corrected current commands id, iq are performed always in parallel, so that when the current command selection part 513 switches the selection of the dq axis current commands, the dq axis current commands as the result of the switching can be previously taken in. Further, when current command selection part 513 is provided with a filter, it is possible to prevent a sudden change at the time of switching the dq axis current commands.

Next, the electric motor control devices of the second embodiment and the third embodiment of the present disclosure will be described with reference to FIG. 11 to FIG. 16. In the descriptions of the block diagrams and the flow charts of the following embodiments, the substantially same constructions and the substantially same steps as the first embodiment will be denoted by the same reference characters and the same step numbers and their descriptions will be omitted and points different from the first embodiment will be described in detail.

Second Embodiment

An electric motor control device of the second embodiment of the present disclosure will be described with reference to FIG. 11 and FIG. 12. The second embodiment is the same as the first embodiment in the determination of orthogonality processing and in the non-orthogonalization processing and is different from the first embodiment in the construction of operating the dq axis voltage commands vd*, vq* on the basis of the selected dq axis current command fixed values id_fix, iq_fix.

Figure 11:
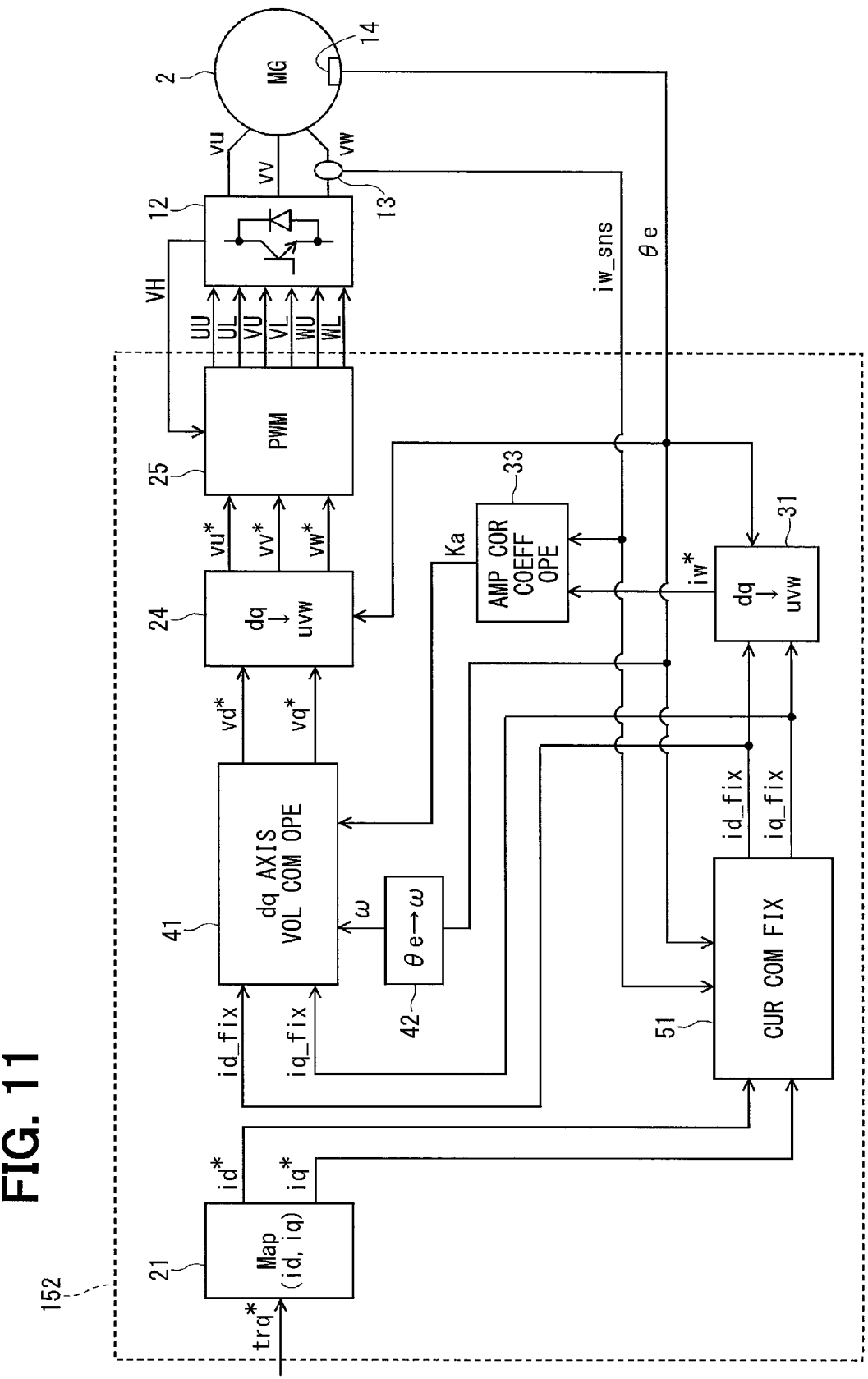
FIG. 11 is a block diagram to show a construction of a control section of a control device of an AC motor according to the second embodiment of the present disclosure.

As shown in FIG. 11, as compared with the control section 151 (FIG. 5) of the first embodiment, a control section 152 of the electric motor control device of the second embodiment does not include the current subtracter 22, the PI operation part 23, and the current estimation part 30, which are the construction of the current feedback control, but includes a dq axis voltage command operation part 41 and an angular velocity calculation part 42 instead. In addition, the control section 152 includes a three phase current command operation part 31 and an amplitude correction coefficient operation part 33.

The dq axis voltage command operation part 41 operates the dq axis voltage commands vd*, vq* by the use of a voltage equation. First, the voltage equation of an electric motor is generally expressed by equations (3.1) and (3.2).

$$vd = Ra \times id + Ld \times (d/dt)id - \omega \times Lq \times iq \quad (3.1)$$

$$vq = Ra \times iq + Lq \times (d/dt)iq + \omega \times Ld \times id + \omega \times \psi \quad (3.2)$$

The reference characters are as follows.
Ra: armature resistance
Ld, Lq: d axis self-inductance, q axis self-inductance
ω: electric angular velocity
ψ: armature interlinkage flux of permanent magnet In this regard, the armature resistance Ra, the d axis self-inductance Ld and the q axis self-inductance Lq, and the armature interlinkage flux ψ of a permanent magnet, which are machine constants of the AC motor 2, may be set at fixed values or may be calculated by calculation. Further, values close to actual characteristics and actual measured values of the machine constants may be stored in a map and the machine constants may be operated on the basis of the torque command value trq* or the d axis current command value id* and the q axis current command value iq*.

Further, when a time differential term (d/dt) expressing a transient property is neglected and the dq axis voltage commands vd*, vq* are used as dq axis voltages and the dq axis current command fixed values id_fix, iq_fix are used as dq axis currents, the equations (3.1), (3.2) are rewritten by (4.1), (4.2).

$$vd^* = Ra \times id\_fix - \omega \times Lq \times iq\_fix \quad (4.1)$$

$$vq^* = Ra \times iq\_fix + \omega \times Ld \times id\_fix + \omega \times \psi \quad (4.2)$$

Further, when $\omega \cong 0$ [rad/s] in the equations (4.1), (4.2), only the term of the armature resistance Ra remains as shown by the equations (4.3), (4.4). For this reason, the d axis voltage command vd* is determined only by the d axis current command fixed value id_fix and the q axis voltage command vq* is determined only by the q axis current command fixed value iq_fix.

$$vd^* = Ra \times id\_fix \quad (4.3)$$

$$vq^* = Ra \times iq\_fix \quad (4.4)$$

The dq axis voltage command operation part 41 acquires the electric angular velocity ω obtained by transforming the electric angle θe by the angular velocity calculation part 42 and checks that $\omega \cong 0$ [rad/s]. The dq axis voltage command operation part 41 operates the dq axis voltage commands vd*, vq* by the use of equations (4.5), (4.6) obtained by further multiplying the right sides of the equations (4.3), (4.4) by "an amplitude correction coefficient Ka", which will be described later. This operation is referred to as "a feed-forward voltage command operation", and the multiplication of the amplitude correction coefficient Ka in the feed-forward voltage command operation is referred to as "amplitude correction".

$$vd^* = Ka \times Ra \times id\_fix \quad (4.5)$$

$$vq^* = Ka \times Ra \times iq\_fix \quad (4.6)$$

Next, the amplitude correction will be described.

The armature resistance Ra in the equations (4.5), (4.6) is likely to be varied by temperature characteristics. Further, in addition, the voltage command value, from which torque according to the command can be generated, is likely to be made different from a voltage command operated value, which is operated by the feed-forward voltage command operation, by the physical factors relating to the AC motor 2 or the electric motor control device. Hence, it is preferable to make a correction reflecting the information of the actual machine by the use of the sensor value iw_sns. Hence, in the feed-forward voltage command operation of the present embodiment, the amplitude correction is employed.

The three current command operation part 31 inversely dq transforms the dq axis current command fixed values id_fix, iq_fix on the basis of the electric angle θe to thereby operate the three phase current commands iu*, iv*, iw*. The amplitude correction coefficient operation part 33 acquires the current command value iw* of the W phase, which is operated by the three phase current command operation part 31, and the current sensed value iw_sns of the W phase, which is sensed by the current sensor 13. Then, the amplitude correction coefficient operation part 33 calculates the amplitude correction coefficient Ka, which is the ratio of the current command value iw* of the W phase to the current sensed value iw_sns of the W phase.

$$Ka = iw^*/iw\_sns \quad (5)$$

Here, when the sensor value iw_sns is always sensed to be zero, the current sensed value iw_sns, which is the denominator of the equation (5), becomes zero and hence the so-called "zero division" of dividing something by zero is caused, which hence causes an operation error. Hence, it is a necessary condition for the amplitude correction that the sensor value iw_sns is always sensed to be not zero. In the present embodiment, the current command fixing part 51 makes the current command vector non-orthogonal to the sensor phase axis, thereby making it possible to sense the sensor value iw_sns that is not zero. Hence, the present embodiment satisfies the condition of the amplitude correction.

Figure 12:
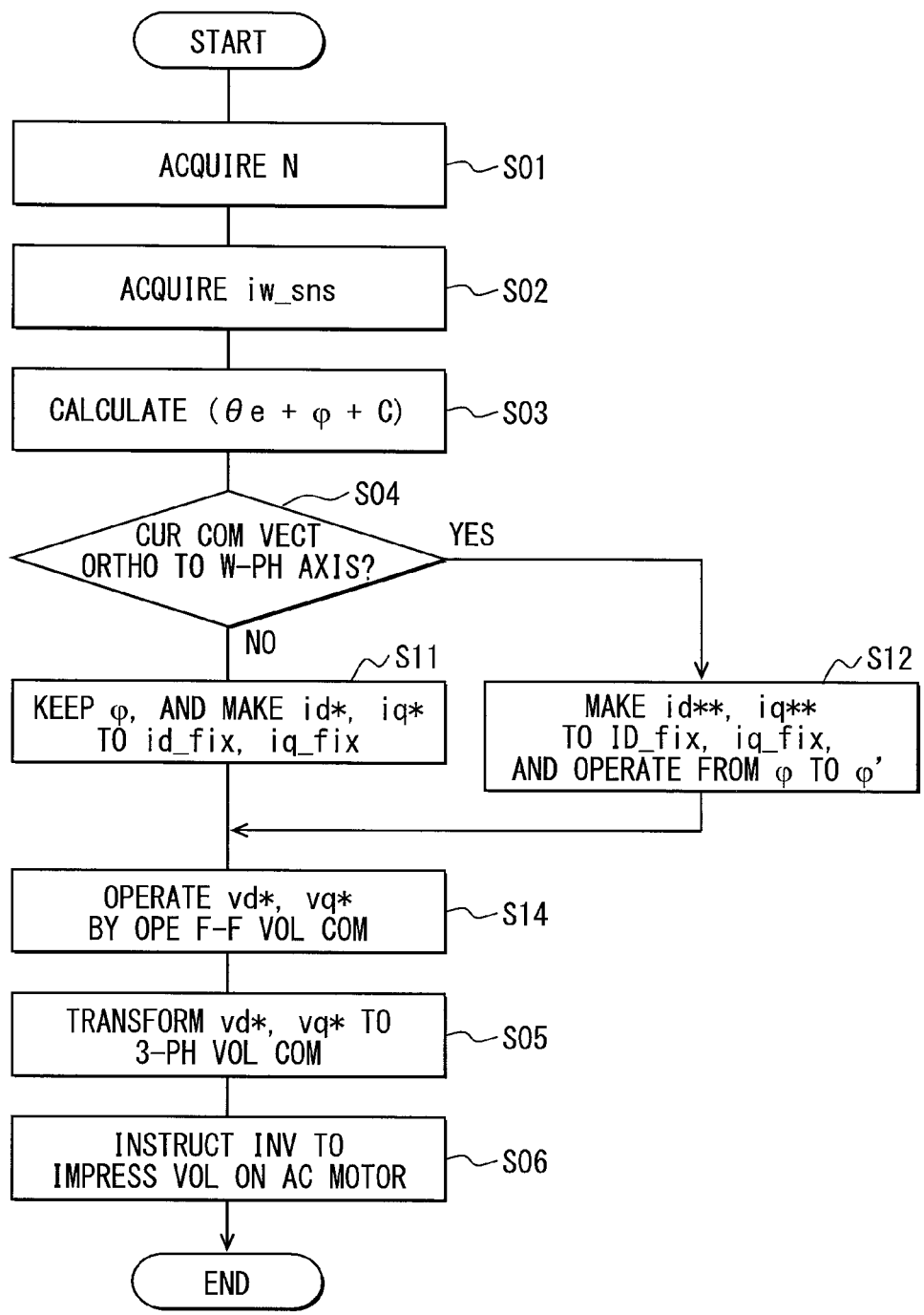
FIG. 12 is a flow chart of a control of current to be passed through the AC motor according to the second embodiment of the present disclosure.

A flow chart shown in FIG. 12 is different from the flow chart of the first embodiment (FIG. 10) in the step of S14 for operating the dq axis voltage commands vd*, vq* by the use of the feed-forward voltage command operation in place of S13 in the flow chart of the first embodiment. Here, the amplitude correction described above is included by "the feed-forward voltage command operation" in S14.

Also in the second embodiment, as in the case of the first embodiment, by operating the current command phase φ the current command vector is made non-orthogonal to the sensor phase axis and hence the sensor value iw_sns that is not zero can be sensed. Hence, an operation error caused by the "zero division" in the operation of the amplitude correction coefficient Ka can be avoided and the feed-forward voltage command operation including the amplitude correction can be appropriately performed. Alternatively, in addition to the operation of the amplitude correction, also when an operation based on the sensor value iw_sns is performed, the "zero division" of dividing something by zero and the "zero multiplication" of multiplying something by zero can be avoided.

Third Embodiment

An electric motor control device of the third embodiment of the present disclosure will be described with reference to FIG. 13 to FIG. 16. The third embodiment is different from the first embodiment and the second embodiment in the construction of the non-orthogonalization processing. That is, in the third embodiment, when the current command vector is orthogonal to the W phase axis, the current command vector is made non-orthogonal to the W phase axis not by operating the current command phase $\phi$ but by operating the electric angle $\theta e$.

As shown in FIG. 13, a control section 153 of the electric motor control device of the third embodiment includes a dq axis voltage command operation part 43, an electric angle operation part 521, a current command phase transformation part 522, and a dq axis voltage command selection part 523. The electric angle operation part 521 provides a determination of orthogonality process, an electric angle operation, and a dq axis voltage command operation.

The dq axis voltage command operation part 43 operates dq axis voltage commands vd*, vq* for the normal control on the basis of the initial dq axis current commands id*, iq* commanded by the current command operation part 21. This operation may be the same current feedback control operation as the first embodiment or may be the same feed-forward voltage command operation as the second embodiment. It is assumed that the block of the dq axis voltage command operation part 43 comprehensively shows the construction of both operations. It is assumed that the sensor value iw_sns and the electric angle $\theta e$, which are inputted to the block, are appropriately selected according to an operation method or are transformed to the values of the number of revolutions N and the electric angular velocity $\omega$. Here, the construction of the amplitude correction in the case of the feed-forward voltage command operation is the same as the second embodiment and the illustration of the construction will be omitted.

When the current command vector is orthogonal to the sensor phase axis, the electric angle operation part 521 operates the electric angle from $\theta e$ to $\theta e'$ to thereby make the current command vector non-orthogonal to the sensor phase axis. Then, the electric angle operation part 521 operates the dq axis voltage commands vd, vq for moving the electric angle on the basis of the electric angle $\theta e'$ after the operation.

The current command phase transformation part 522 outputs the current command phase $\phi$, which is transformed from the initial dq axis current commands id*, iq*, to the dq axis voltage command selection part 523.

The dq axis voltage command selection part 523 acquires the information of the electric angle $\theta e$, the current command phase $\phi$, and the sensor value iw_sns, and selects the dq axis voltage commands vd*, vq* for the normal control, which are operated by the dq axis voltage command operation part 43, or the dq axis voltage commands vd, vq for moving the electric angle, which are operated by the electric angle operation part 521. Then, the dq axis voltage command selection part 523 outputs the dq axis voltage commands vd*, vq* or the dq axis voltage commands vd, vq, which are selected, as the dq axis voltage command fixed values vd_fix, vq_fix to the inverse transformation part 24. When the dq axis voltage command selection part 523 performs the non-orthogonalization processing, the dq axis voltage command selection part 523 selects the dq axis voltage commands vd, vq for moving the electric angle.

The three phase voltage commands obtained by transforming the dq axis voltage commands vd, vq for moving the electric angle, which are selected by the dq axis voltage command selection part 523, by the inverse transformation part 24 results in being shifted by a given phase with respect to the three phase voltage commands obtained by transforming the dq axis voltage commands vd*, vq* for the normal control, which are selected by the dq axis voltage command selection part 523, by the inverse transformation part 24. As a result, the sensor value iw_sns that is not zero can be sensed.

The non-orthogonalization processing of the third embodiment will be described with reference to FIG. 14 and FIG. 15.

Figure 14A:
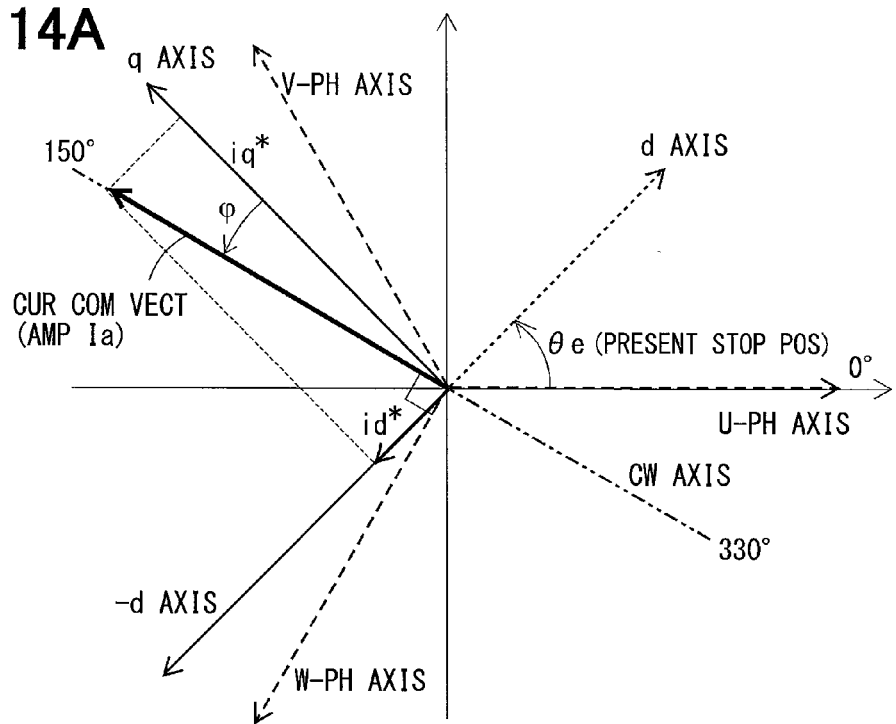
FIGS. 14A and 14B are charts to illustrate an electric angle operation that is non-orthogonalization processing according to the third embodiment of the present disclosure.

FIG. 14A is basically the same as FIG. 7A of the first embodiment and shows a state in which the AC motor 2 is stopped at the position in which the current command vector is orthogonal to the W phase axis. At this time, the sensor value iw_sns always becomes zero and hence the AC motor 2 cannot be stably driven.

In particular, in the third embodiment, attention is focused on the position in which the AC motor 2 is stopped and the electric angle $\theta e$ of a (+d) axis based on the U phase axis is expressed by "a present stop position" in FIG. 14A. As described above, "stop" means not only the state in which the number of revolutions N is strictly 0 [rpm] but also the state of low rotation where the electric angle movement $\Delta\theta e$ for the control period is small. In the third embodiment, the non-orthogonalization is realized by operating the electric angle $\theta e$ to thereby move the position in which the AC motor 2 is stopped.

Figure 14B:
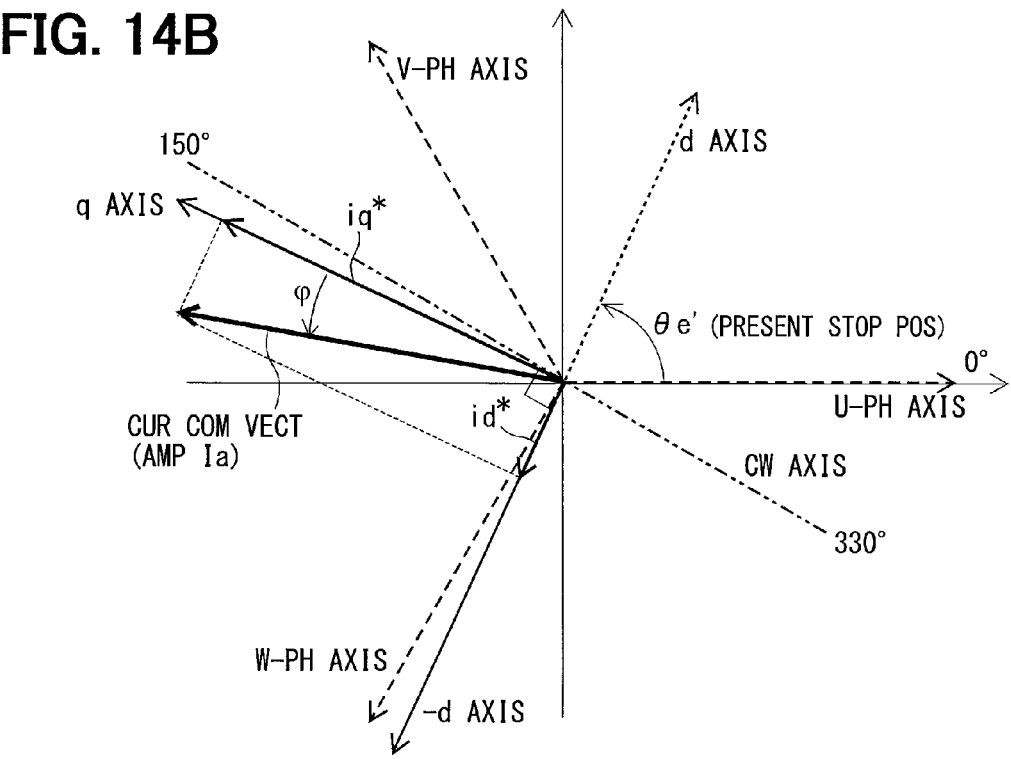

As shown in FIG. 14B, the electric angle operation part 521 rotates the AC motor 2 from "the present stop position" corresponding to the electric angle $\theta e$ to "a target stop position" corresponding to the electric angle $\theta e'$. The current command phase $\phi$ is not changed. As a result, the phase angle of the current command vector after the operation is made ($\theta e' + \phi + 90$ [°]), whereby the current command vector is made non-orthogonal to the W phase axis.

When the electric angle operation part 521 shifts the electric angle $\theta e$, for example, by 30 [°] from the stop position in which the sensor value iw_sns is 0 [A], as in the case of operating the current command phase $\phi$, a component in the W phase axis direction of the current command vector becomes (½) Ia. Hence, the sensor value iw_sns that is not zero can be sensed.

In order to operate the electric angle $\theta e$, a small torque is generated by a positioning control or by a q axis current command operation to thereby rotate the rotor of the AC motor 2. A rotation angle (mechanical angle) of the rotor is equal to (electric angle/number of pairs of poles), so that, for example, when the number of pairs of poles is 4, when an electric angle of 30 [°] is converted to the rotation angle of the rotor, the rotation angle of the rotor becomes 7.5 [°].

Here, when an output shaft is mechanically coupled to an axle like an AC motor mounted in an electric vehicle such as a hybrid automobile, the user is likely to have a feeling of strangeness by the torque generated when the rotor is rotated. Hence, it is preferable that the amount of operation of the electric angle in the non-orthogonalization processing is set at a minimum amount of movement which makes it possible to sense the sensor value iw_sns.

As an operation procedure, it is preferable to slightly operate a current command vector to thereby slightly move the position of the rotor. In more detail, the electric angle $\theta e$ of the present stop position is held and the dq axis current commands id*, iq* are operated to the electric angle $\theta e'$ of the target stop position along the current command line CL0 to thereby impress voltage based on the dq axis voltage commands vd*, vq* on the AC motor 2, thereby making the AC motor 2 generate torque. In this way, the stop position of the rotor is operated (see FIG. 15A).

Further, when the AC motor 2 is stopped ($\omega = 0$), the voltage equations are expressed by the equations (6.1), (6.2), so that the d axis current id is determined by the d axis voltage vd and the q axis current iq is determined by the q axis voltage vq. That is, the dq axis currents and the dq axis voltages are brought into the same phase.

$$vd = Ra \times id \quad (6.1)$$

$$vq = Ra \times iq \quad (6.2)$$

Figure 15A:
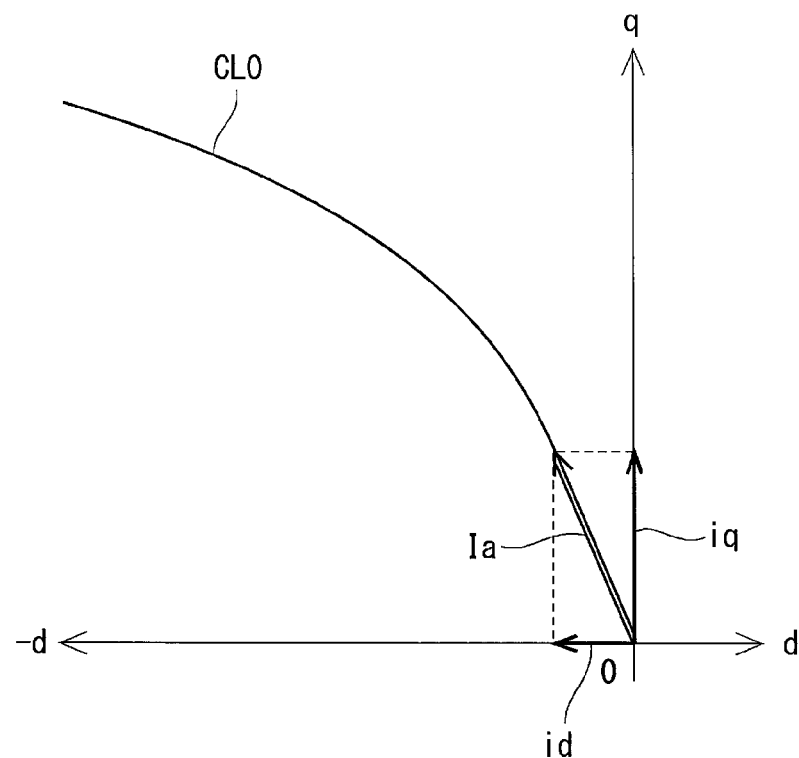
FIGS. 15A and 15B are charts to illustrate an operation of dq axis current commands in the electric angle operation.
Figure 15B:
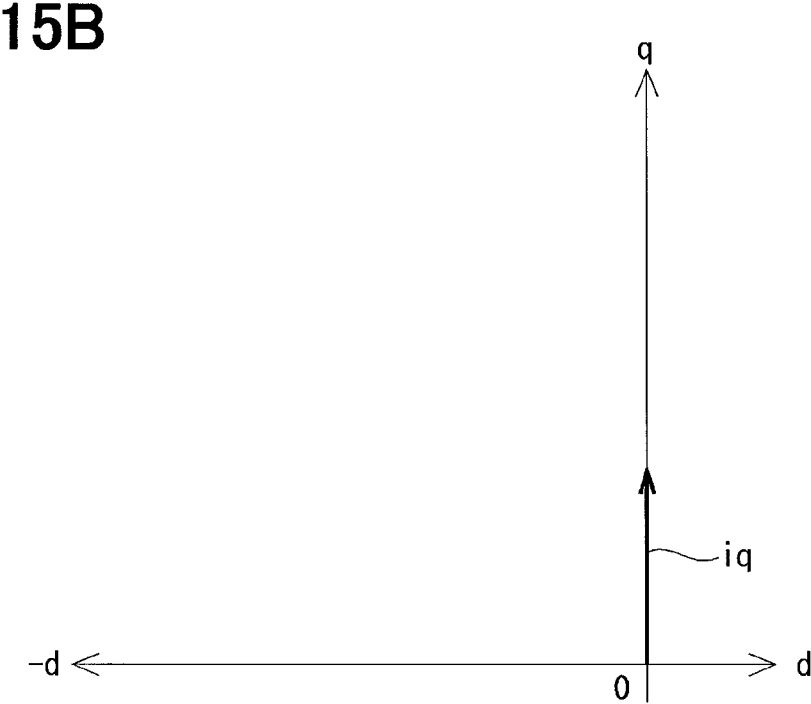

Alternatively, only the q axis current command iq* may be operated to thereby impress only the voltage based on the q axis voltage command vq* on the AC motor 2, thereby making the AC motor 2 generate torque (see FIG. 15B).

In this regard, when the AC motor 2 is stopped, the torque for slightly moving the stop position of the rotor can be sufficiently small and it is required only that the sensor value iw_sns can be sensed, but a strict accuracy for the amount of operation is not required. Hence, for example, it is only necessary to appropriately operate the dq axis voltage commands by a method of increasing and decreasing the dq axis voltage commands by 1LSB (resolution) while watching the electric angle movement Δθe.

Further, the above object can be achieved also by finding the equations (6.1), (6.2) by calculation, by using a map in which the voltage commands for a torque command and a current command are stored, or by directly increasing and decreasing the voltage commands on the basis of the values of the electric angle movement and the like.

Still further, in order to prevent the user's feeling of strangeness, upper limits may be set for the target stop position θe' and for an operation rate to the target stop position θe'.

Figure 16:
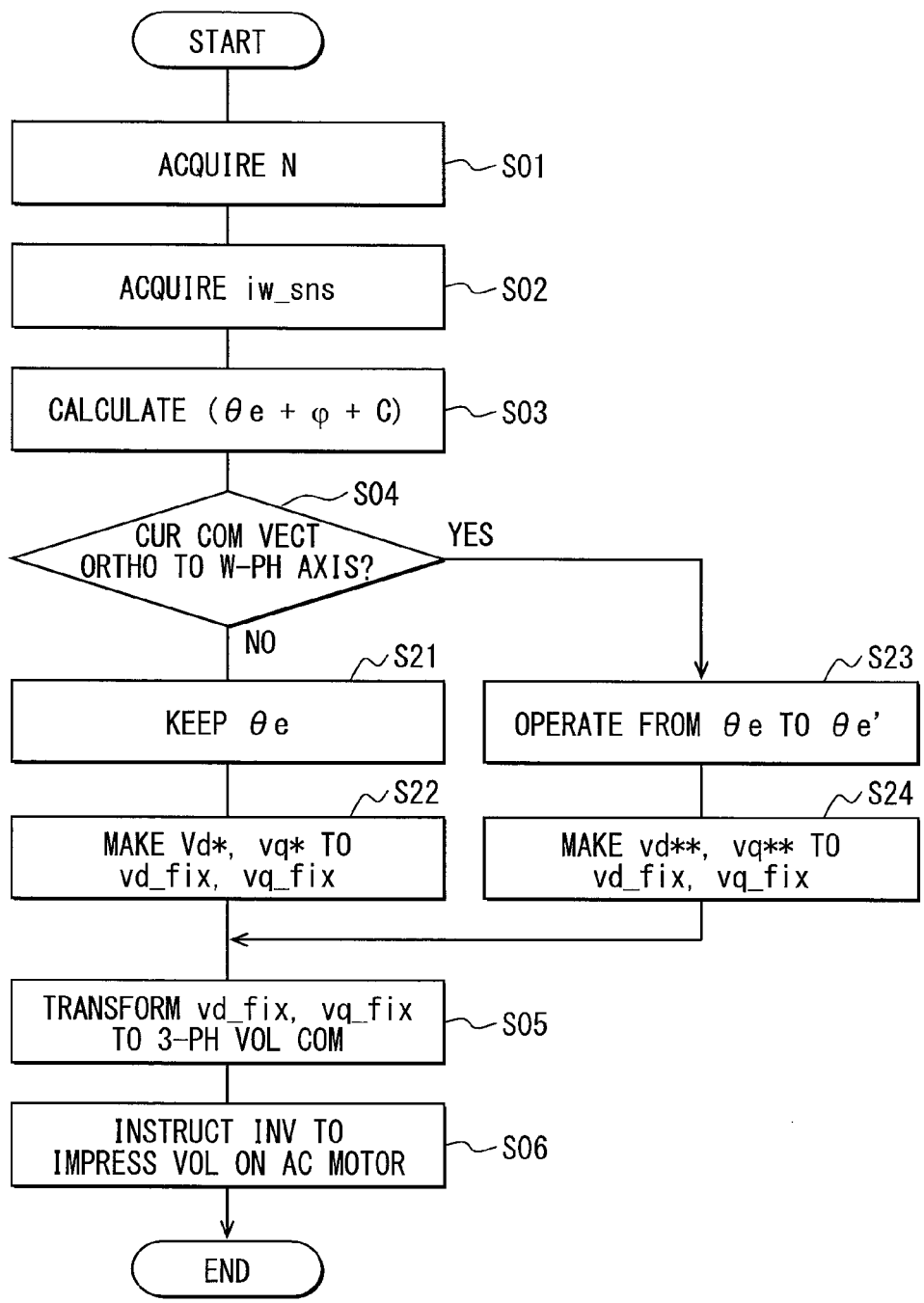
FIG. 16 is a flow chart of a control of current to be passed through the AC motor according to the third embodiment of the present disclosure.

A flow chart shown in FIG. 16 is different from the flow chart of the first embodiment (FIG. 10) in the steps of S21 to S24.

When it is determined in S04 that the current command vector is not orthogonal to the W phase axis (S04: NO), the present electric angle θe is held in S21, and the dq axis voltage commands vd*, vq* based on the electric angle θe are made the dq axis voltage command fixed values vd_fix, vq_fix, and then the routine proceeds to S05.

On the other hand, when it is determined in S04 that the current command vector is orthogonal to the W phase axis (S04: YES), the electric angle is operated from θe to θe' in S23. Here, S23 provides a non-orthogonalization processing. Then, in S24, the dq axis voltage commands vd, vq based on the electric angle θe' after the operation are made the dq axis voltage command fixed values vd_fix, vq_fix, and then the routine proceeds to S05.

The other steps are the same as the first embodiment.

As described above, in the third embodiment, the current command vector can be made non-orthogonal to the W phase axis by operating the electric angle θe, whereby the sensor value iw_sns that is not zero can be sensed. Hence, the estimation accuracy when the AC motor 2 is started or is in a low rotation range can be improved. Further, when an operation based on the sensor value iw_sns such as the amplitude correction is performed, "the zero multiplication" and "the zero division" can be avoided.

From the viewpoint of preventing the user's feeling of strangeness, for example, when it is found in advance that the AC motor is stopped at this time and that the current command vector when the AC motor is started next time is orthogonal to the W phase axis, the third embodiment is effective in the case in which the current command vector is made non-orthogonal to the W phase axis for the next time when the AC motor is started. Alternatively, the third embodiment can be effectively used for a system in which the output shaft of the electric motor is not coupled to an operation shaft operated by the user.

Other Embodiments (A) The sensor phase for sensing the phase current by the current sensor is not limited to the W phase of the embodiments described above but may be the U phase or the V phase. Further, the base of the electric angle θe on the three phase coordinates may be an axis of a phase other than the U phase axis and the base of the current command phase φ on the dq axis coordinates may not be the q axis but may be the d axis.

(B) In addition to making the determination of orthogonality from an angle relationship between the current command vector and the sensor phase axis on the three phase coordinates, as in the case of the embodiments described above, the determination of orthogonality may be made in the following manner: three phase current commands are calculated by inversely dq transforming the dq axis current commands id*, iq* that are not zero; and the current command of the sensor phase is compared with the sensor value (when the sensor phase is the W phase, the current command iw* of the W phase is compared with the sensor value iw_sns). When the dq axis current commands id*, iq* are not zero and the current command value of the sensor phase is continuously zero, it is determined that the current command vector is orthogonal to the sensor phase axis and that the non-orthogonalization processing is required.

(C) In the non-orthogonalization processing, the operation of the current command phase φ according to the first embodiment and the second embodiment and the operation of the electric angle θe according to the third embodiment may be used in combination.

(D) In addition to the current estimation method employed by the current estimation part 30 of the first embodiment, other current estimation methods that the current estimation part can employ will be described in the following (i) to (iv) by way of example.

(i) Operation Based on a Current Reference Angle Based on the Current Command Phase Angle and the Amplitude (Technique Disclosed in JP-A No. 2004-159391)

When it is assumed that the sensor phase is the U phase, the current amplitude (Ia) is calculated by dividing a U phase current sensor value (Iu) by "a U phase current reference angle (θ'), which is generated from a current command phase angle acquired from the dq axis current commands and an electric angle", and the current estimated values Iv, Iw of the other two phases are calculated by multiplying a sine value at an electric angle, which is shifted from the U phase current reference angle (θ') by ±120 [°], by the current amplitude (Ia) (equations 7.1 to 7.3)

$$Ia = Iu / [\sqrt{(1/3)} \times (\{-\sin(\theta')\})] \quad (7.1)$$

$$Iv = \sqrt{(1/3)} \times Ia \times (\{-\sin(\theta'+120[°])\}) \quad (7.2)$$

$$Iw = \sqrt{(1/3)} \times Ia \times (\{-\sin(\theta'+240[°])\}) \quad (7.3)$$

In this method, when the AC motor 2 is stopped at the position in which the U phase current sensor value is 0 [A], the current amplitude cannot be calculated and the current estimated values of the other two phases are fed back with the current estimated values assumed to be 0 [A], so that the significant current estimated values of the other two phases cannot be acquired. However, by applying the non-orthogonalization processing of the present disclosure, the sensor value can be made the value that is not zero, whereby the feedback control can be performed.

(ii) Operation Based on the Sensor Phase Reference Phase Using the Current Command Values By using at least one of the U phase current command value iu* and the V phase current command value iv*, the W phase current sensed value iw_sns, and the electric angle θe, an α axis current iα in an φ axis direction corresponding to the sensor phase and a β axis current iβ in β axis direction orthogonal to the sensor phase are operated and a sensor phase reference current phase θx is calculated by an equation (8).

$$\theta x = \tan^{-1}(i\beta/i\alpha) \quad (8)$$

Further, the U phase current estimated value iu_est or the V phase current estimated value iv_est are operated on the basis of the sensor phase reference current phase θx and the W phase current sensed value iw_sns, and the d axis current estimated value id_est and the q axis current estimated value iq_est are operated on the basis of the U phase current estimated value iu_est or the V phase current estimated value iv_est, the W phase current sensed value iw_sns, and the electric angle θe. In this regard, in the operation of the U phase current estimated value iu_est or the V phase current estimated value iv_est, there may be performed correction processing of avoiding "the zero division" of dividing something by zero and "the zero multiplication" of multiplying something by zero.

(iii) Operation by Differentiating α Axis Current

By focusing on that the α axis current iα and the β axis current iβ are in the relationship between "a sine wave and a cosine wave" and that a phase difference between the α axis current iα and the β axis current iβ is 90 [°], a β axis current estimated value iβ_est is operated on the basis of an α axis current differentiated value Δ iα. Here, when the operation in the control section is a discrete system, the α axis current differentiated value Δ iα is delayed by a half of an electric angle movement Δθe with respect to an actual β axis current iβ. Taking this in consideration, it is preferable that the β axis current estimated value iβ_est is operated by correcting the actual β axis current iβ by a correction amount H obtained by multiplying an average value of the α axis current iα of the last time and the α axis current iα of this time by a half (Δθe/2) of the electric angle movement Δθe. Then, the sensor phase reference current phase θx is operated by the use of the α axis current iα and the β axis current estimated value iβ_est. The subsequent operations are the same as those in (ii).

(iv) Operation by a Recurrence Formula

By using that the W phase axis relatively rotates on the d–q coordinates, a W phase estimated error Δiw_est is integrated to thereby make the dq axis current estimated values asymptotic to the dq axis actual current values.

A W phase current reference value iw_bf of a sensor phase component is operated on the basis of the dq axis current estimated values id_est, iq_est of the last time and the electric angle θe of this time, and a W phase estimated error Δiw_est, which is a difference between the W phase current reference value iw_bf and the W phase current sensed value iw_sns, is calculated. A corrected error KΔiw_est is calculated by multiplying the W phase estimated error Δiw_est by a gain K of a filter element, and dq axis correction values id_crr, iq_crr are operated by the dq transformation on the assumption that Δiu=0 and Δiv=0.

Then, the calculated d axis correction value id_crr and the calculated q axis correction value iq_crr are made a correction vector in the sensor phase direction and the correction vector is integrated in the d–q coordinate system, whereby the d axis current estimated values id_est and the q axis current estimated values iq_est are operated.

Moreover, the following operation may be employed: a correction value in an orthogonal direction orthogonal to the sensor phase is further operated; a resultant vector of the correction value in the sensor phase direction and the correction value in the orthogonal direction is made a correction vector; and the correction vector is integrated in the d–q coordinate system.

(E) In the second embodiment, the dq axis voltage commands vd*, vq* are calculated by the use of the dq axis current commands id*, iq* and the machine constants, but the dq axis voltage commands vd*, vq* may be calculated by referring to a map stored in advance on the basis of actual measurement by using the dq axis current commands and other information as parameters. Further, as to the map, in order to correct the difference between the voltage commands based on the voltage command operation and the voltage command values that generate torque according to the command, for example, values including the correction values of the voltage error caused by a dead time may be stored in the map.

(F) The rotation angle sensor is not limited to a mode for sensing the electric angle θe and outputting the electric angle θe to the control section, but may sense a rotor rotation angle (mechanical angle) θm and may output the rotor rotation angle θm to the control section and the rotor rotation angle θm may be converted to the electric angle θe in the control section. Further, the number of revolutions N may be calculated on the basis of the mechanical angle θm.

(G) In the embodiments described above has been described the example in which "the current sensor for control" for sensing current used for the control is provided in one phase. In the other embodiment, in addition to the current sensor for control, an independent "current sensor for monitoring" for monitoring an abnormality of the current sensor for control may be provided in the sensor phase or a phase other than the senor phase. As an example, a one-phase two-channel construction in which the current sensor for control and the current sensor for monitoring are provided in one phase and a two-phase one-channel construction in which the current sensor for control is provided in one phase and in which the current sensor for monitoring is provided in any one phase other than the one phase may be employed. In either of the constructions, any number of current sensors may be in any phase.

(H) In the embodiments described above, the AC motor is the three phase AC motor of the permanent magnet synchronous type. In the other embodiment, the AC motor may be an induction motor or the other synchronous motor. Further, each of the AC motors of the embodiments described above is the so-called motor generator having both of the function as the electric motor and the function as the generator. In the other embodiment, the AC motor may be an electric motor not having the function as the generator.

The AC motor may be so constructed as to operate as an electric motor for an engine and to start the engine. Further, the engine may not be provided. Still further, a plurality of AC motors may be provided and a power dividing mechanism for dividing the power of the plurality of AC motors may further be provided.

(I) Further, the control device of the AC motor according to the present disclosure may be applied not only to the system having one set of the inverter and the AC motor, as described in the above embodiments, but also to a system having two or more sets of the inverter and the AC motor. Further, the control device of the AC motor according to the present disclosure may be applied to a system of an electric train or the like having a plurality of AC motors connected in parallel to one inverter.

(J) A control device of an AC motor according to the present disclosure is not limitedly applied to the AC motor of the hybrid automobile having the construction shown in FIG. 1 but may be applied to an AC motor of an electric vehicle having any construction. Further, the control device of an AC motor according to the present disclosure may be applied to an AC motor other than the electric vehicle.

The above disclosure has the following aspects.

According to an aspect of the present disclosure, a control device of a three phase alternating current motor includes: an inverter for driving the motor; a current sensor for sensing current flowing in a sensor phase of the motor, which is one of three phases of the motor; and a controller for switching on and off a plurality of switching elements, which provide the inverter, so that the controller controls the current flowing through the motor. An electric angle is defined as θe when one of the three phases is referred as a basis. A phase is defined as φ when a dq axis is referred as a basis. A phase angle of a current command vector is defined as (θe+φ+C). C represents a constant. When the motor is stopped, the controller determines whether the current command vector is orthogonal to an axis of the sensor phase on three phase coordinates. When the controller determines that the current command vector is orthogonal to the axis of the sensor phase, the controller operates the phase or the electric angle so as to perform a non-orthogonalization process for setting the current command vector not to be orthogonal to the axis of the sensor phase.

Here, a term of "stop" in a phase of "when the AC motor is stopped" includes not only a case in which the number of revolutions is strict 0 [rpm] but also a low rotation state in which the number of revolutions is not more than a given number of revolutions. For example, a state in which an electric angle period is sufficiently long as compared with a control period or a sampling interval of a current sensor is referred to as "stop".

Further, a term of "orthogonal" in a phase of "when a current command vector is orthogonal to an axis of a sensor phase" includes not only a case in which an intersection angle is strict 90 [°] but also a case in which an intersection angle is within a given range near 90 [°]. Still further, a term of "non-orthogonal" does not mean to exclude only a position in which an intersection angle is strict 90 [°] but means that an intersection angle is outside the given range near 90 [°].

Still further, a current command vector defining the phase angle excludes "a zero vector" by which the phase angle cannot be considered, that is, a vector in which amplitude is zero.

It is when the current command vector is orthogonal to the W phase axis on the three phase coordinates that the current sensed value of the sensor phase is always sensed to be zero when the AC motor is stopped. Hence, by determining whether or not the current command vector is orthogonal to the W phase axis on the three phase coordinates, it can be determined whether or not the AC motor is located at a position in which the current sensed value of the sensor phase is always sensed to be zero.

On the contrary, by making the current command vector non-orthogonal to the axis of the sensor phase when the AC motor is stopped, the current sensed value of the sensor phase that is not zero can always be sensed.

According to the above control device, when the AC motor is stopped and where the current command vector is orthogonal to the axis of the sensor phase, by making the current command vector non-orthogonal to the axis of the sensor phase by non-orthogonalization processing, a sensor value that is not zero can always be sensed irrespective of a position in which the AC motor is stopped. In this way, in particular, at the time when the AC motor is started and is within a low rotation range, the estimation accuracy of a current value can be improved and hence the AC motor can be stably driven.

Alternatively, the controller may correct a dq axis current command in the non-orthogonalization process so that the controller operates the phase. In this way, the controller can make the current command vector non-orthogonal to the axis of the sensor phase, thereby being able to always sense the current value of the sensor phase.

Further, the control device may operate the phase in the non-orthogonalization process while changing a current amplitude so as to hold a torque to be constant. The torque is generated based on the current command vector. Specifically, it is only necessary that the controller moves the current command vector on a line of equal torque on the dq coordinates.

While the non-orthogonalization processing is performed, the current to be passed through the AC motor is controlled on the basis of dq axis current commands after correction. Then, when the current command vector is made non-orthogonal to the axis of the sensor phase by the non-orthogonalization processing, the drive control of the AC motor may be returned to a normal control according to the initial dq axis current commands. In order to avoid a sudden change at the time of switching the dq axis current commands, the controller may always and concurrently perform a calculation of the dq axis current command in a normal control state and a calculation of a corrected dq axis current command.

Alternatively, the controller may operate the electric angle in the non-orthogonalization process.

Alternatively, the controller may include a current estimation device for estimating a dq axis current estimated value based on a current sensed value of the sensor phase. The controller feeds back the dq axis current estimated value to a dq axis current command so that the controller calculates a dq axis voltage command, which is to be outputted to the inverter.

Alternatively, the controller may calculate a dq axis voltage command, which is to be outputted to the inverter, based on a dq axis current command and a machine constant of the motor.

When the controller operates the electric angle (θ) in the non-orthogonalization processing, the controller generates the torque to thereby rotate the AC motor. In this way, the controller makes the current command vector non-orthogonal to the axis of the sensor phase, thereby making it possible to always sense the current value of the sensor phase.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device of a three phase alternating current motor comprising:
    an inverter for driving the motor;
    a current sensor for sensing current flowing in a sensor phase of the motor, which is one of three phases of the motor; and
    a controller for switching on and off a plurality of switching elements, which provide the inverter, so that the controller controls the current flowing through the motor,
    wherein an electric angle is defined as θe when one of the three phases is referred as a basis,
    wherein a phase is defined as φ when a dq axis is referred as a basis, wherein a phase angle of a current command vector is defined as (θe+φ+C),
wherein C represents a constant,
wherein, when the motor is stopped, the controller determines whether the current command vector is orthogonal to an axis of the sensor phase on three phase coordinates, and
wherein, when the controller determines that the current command vector is orthogonal to the axis of the sensor phase, the controller operates the phase or the electric angle so as to perform a non-orthogonalization process for setting the current command vector not to be orthogonal to the axis of the sensor phase.

2. The control device according to claim 1,
wherein the controller corrects a dq axis current command in the non-orthogonalization process so that the controller operates the phase.

3. The control device according to claim 2,
wherein the control device operates the phase in the non-orthogonalization process while changing a current amplitude so as to hold a torque to be constant, and
wherein the torque is generated based on the current command vector.

4. The control device according to claim 2,
wherein the controller always and concurrently performs a calculation of the dq axis current command in a normal control state and a calculation of a corrected dq axis current command.

5. The control device according to claim 1,
wherein the controller operates the electric angle in the non-orthogonalization process.

6. The control device according to claim 1,
wherein the controller includes a current estimation device for estimating a dq axis current estimated value based on a current sensed value of the sensor phase, and
wherein the controller feeds back the dq axis current estimated value to a dq axis current command so that the controller calculates a dq axis voltage command, which is to be outputted to the inverter.

7. The control device according to claim 1,
wherein the controller calculates a dq axis voltage command, which is to be outputted to the inverter, based on a dq axis current command and a machine constant of the motor.

* * * * *